US008577704B2

(12) United States Patent
Cannon et al.

(10) Patent No.: US 8,577,704 B2
(45) Date of Patent: Nov. 5, 2013

(54) AUTOMATICALLY GENERATING FORMULAS BASED ON PARAMETERS OF A MODEL

(75) Inventors: Howard I. Cannon, Boston, MA (US); Richard J. Petti, Arlington, MA (US)

(73) Assignee: Modelsheet Software, LLC, Arlington, MA (US)

( * ) Notice: Subject to any disclaimer, the term of this patent is extended or adjusted under 35 U.S.C. 154(b) by 1166 days.

(21) Appl. No.: 11/953,627

(22) Filed: Dec. 10, 2007

(65) Prior Publication Data

US 2009/0150426 A1 Jun. 11, 2009

(51) Int. Cl.
*G06Q 40/00* (2012.01)
(52) U.S. Cl.
USPC .......................................... 705/7.11; 705/7.42
(58) Field of Classification Search
USPC ........................................ 705/7, 7.42, 7.11
See application file for complete search history.

(56) References Cited

U.S. PATENT DOCUMENTS

| | | | |
|---|---|---|---|
| 5,371,675 A | 12/1994 | Greif et al. | |
| 5,499,180 A | 3/1996 | Ammirato et al. | |
| 5,603,021 A * | 2/1997 | Spencer et al. | 1/1 |
| 5,623,591 A * | 4/1997 | Cseri | 715/762 |
| 5,883,623 A | 3/1999 | Cseri | |
| 5,890,174 A * | 3/1999 | Khanna et al. | 715/210 |
| 6,134,563 A | 10/2000 | Clancey et al. | |
| 6,175,949 B1 | 1/2001 | Gristede et al. | |
| 6,292,811 B1 | 9/2001 | Clancey et al. | |
| 6,430,584 B1 * | 8/2002 | Comer et al. | 715/212 |
| 6,496,832 B2 | 12/2002 | Chi et al. | |
| 6,640,234 B1 * | 10/2003 | Coffen et al. | 715/219 |
| 6,766,512 B1 | 7/2004 | Khosrowshahi et al. | |
| 6,834,212 B1 | 12/2004 | Patel et al. | |
| 7,082,569 B2 | 7/2006 | Voshell | |
| 7,107,519 B1 | 9/2006 | Webster et al. | |
| 7,127,709 B2 | 10/2006 | Demsey et al. | |
| 7,143,339 B2 | 11/2006 | Weinberg et al. | |
| 7,213,199 B2 | 5/2007 | Humenansky et al. | |

OTHER PUBLICATIONS

"Calculated Fields in Pivot Tables," From Blog: Daily Dose of Excel, Aug. 8, 2005. On-line: http://www.dicks-blog.com/archives/2005/08/08/calculated-fields-in-pivot-tables/ , accessed Jul. 29, 2009, 13 pages.
International Search Report & Written Opinion in PCT application No. PCT/US2008/086125, mailed Jul. 20, 2009, 11 pages.
"Olap Cube," From Wikipedia. On-line: http://en.wikipedia.org/wiki/OLAP_cube, accessed Nov. 25, 2007, 3 pages.
"Quantrix® Modeler Version 2.4 User Guide." 2007. 368 pages.

\* cited by examiner

*Primary Examiner* — Thomas Dixon
*Assistant Examiner* — Benjamin S Fields
(74) *Attorney, Agent, or Firm* — Lando & Anastasi, LLP

(57) ABSTRACT

An output formula is automatically generated from an input formula using one of multiple methods determined by types of one or more parameters associated with the input formula and a dimensional operation associated with a dimension of at least a first parameter. The automatically generated output formula is stored, or a representation based on the automatically generated output formula is presented using a user interface.

36 Claims, 15 Drawing Sheets

FIG. 5

| Gross Margin pct Combine by Sum | | Gross Margin pct Combine by Averaging | | Gross Margin pct Combine by Formula | |
|---|---|---|---|---|---|
| Products | 2007 | Products | 2007 | Products | 2007 |
| Product A | 86% | Product A | 86% | Product A | 86% |
| Product B | 47% | Product B | 47% | Product B | 47% |
| Total | 133% | Total | 66% | Total | 77% |

| Gross Margin | | Gross Margin | | Gross Margin | |
|---|---|---|---|---|---|
| Products | 2007 | Products | 2007 | Products | 2007 |
| Product A | $280 | Product A | $280 | Product A | $280 |
| Product B | $47 | Product B | $47 | Product B | $47 |
| Total | $327 | Total | $327 | Total | $327 |

| Revenue | | Revenue | | Revenue | |
|---|---|---|---|---|---|
| Products | 2007 | Products | 2007 | Products | 2007 |
| Product A | $327 | Product A | $327 | Product A | $327 |
| Product B | $100 | Product B | $100 | Product B | $100 |
| Total | $427 | Total | $427 | Total | $427 |

| "Never" a good approximation | Good approximation when revenues are roughly the same for all products | Exactly correct in all cases |
|---|---|---|

FIG. 6

| Gross Margin pct Combine by Sum | | Gross Margin pct Combine by Averaging | | Gross Margin pct Combine by Formula | |
|---|---|---|---|---|---|
| Products | 2007 | Products | 2007 | Products | 2007 |
| Product A | =B12/B18 | Product A | =B12/B18 | Product A | =B12/B18 |
| Product B | =B13/B19 | Product B | =B13/B19 | Product B | =B13/B19 |
| Total | =SUM(B6:B7) | Total | =AVERAGE(B6:B7) | Total | =B14/B20 |

| Gross Margin | | Gross Margin | | Gross Margin | |
|---|---|---|---|---|---|
| Products | 2007 | Products | 2007 | Products | 2007 |
| Product A | 280 | Product A | 280 | Product A | 280 |
| Product B | 47 | Product B | 47 | Product B | 47 |
| Total | =SUM(B12:B13) | Total | =SUM(B12:B13) | Total | =SUM(B12:B13) |

| Revenue | | Revenue | | Revenue | |
|---|---|---|---|---|---|
| Products | 2007 | Products | 2007 | Products | 2007 |
| Product A | 327 | Product A | 327 | Product A | 327 |
| Product B | 100 | Product B | 100 | Product B | 100 |
| Total | =SUM(B18:B19) | Total | =SUM(B18:B19) | Total | =SUM(B18:B19) |

| "Never" a good approximation | Good approximation when revenues are roughly the same for all products | Exactly correct in all cases, given adequate data |
|---|---|---|

FIG. 7

Gross Margin pct
Combine by Formula

| Products | 2007 |
|---|---|
| Product A | =GM[Prod.A] / Rev[Prod.A] |
| Product B | =GM[Prod.B] / Rev[Prod.B] |
| Total | =(GM[Prod.A]+GM[Prod.B]) / (Rev[Prod.A]+Rev[Prod.B]) |

Gross Margin

| Products | 2007 |
|---|---|
| Product A | $280 |
| Product B | $47 |
| Total | =GM[Prod.A]+GM[Prod.B] |

Revenue

| Products | 2007 |
|---|---|
| Product A | $327 |
| Product B | $100 |
| Total | =Rev[Prod.A]+Rev[Prod.B] |

FIG. 8

| Gross Margin pct Split by Proportion | | Gross Margin pct Split by Replicate | | Gross Margin pct Split by Formula | |
|---|---|---|---|---|---|
| Products | 2007 | Products | 2007 | Products | 2007 |
| Product A | 38% | Product A | 77% | Product A | 86% |
| Product B | 38% | Product B | 77% | Product B | 47% |
| Total | 77% | Total | 77% | Total | 77% |

| Gross Margin | | Gross Margin | | Gross Margin | |
|---|---|---|---|---|---|
| Products | 2007 | Products | 2007 | Products | 2007 |
| Product A | $280 | Product A | $280 | Product A | $280 |
| Product B | $47 | Product B | $47 | Product B | $47 |
| Total | $327 | Total | $327 | Total | $327 |

| Revenue | | Revenue | | Revenue | |
|---|---|---|---|---|---|
| Products | 2007 | Products | 2007 | Products | 2007 |
| Product A | $327 | Product A | $327 | Product A | $327 |
| Product B | $100 | Product B | $100 | Product B | $100 |
| Total | $427 | Total | $427 | Total | $427 |

| "Never" a good approximation | Good approximation when revenues are roughly the same for all products | Exactly correct in all cases, given adequate data |
|---|---|---|

FIG. 9

| Gross Margin pct Split by Proportion | | Gross Margin pct Split by Replicate | | Gross Margin pct Split by Formula | |
|---|---|---|---|---|---|
| Products | 2007 | Products | 2007 | Products | 2007 |
| Product A | =E8/2 | Product A | =E8 | Product A | =GM[Prod.A] / Rev[Prod.A] |
| Product B | =E8/2 | Product B | =E8 | Product B | =GM[Prod.B] / Rev[Prod.B] |
| Total | =E14/E20 | Total | =E14/E20 | Total | =(GM[Prod.A]+GM[Prod.B]) / (Rev[Prod.A]+Rev[Prod.B]) |

| Gross Margin | | Gross Margin | | Gross Margin | |
|---|---|---|---|---|---|
| Products | 2007 | Products | 2007 | Products | 2007 |
| Product A | 280 | Product A | 280 | Product A | $280 |
| Product B | 47 | Product B | 47 | Product B | $47 |
| Total | =SUM(E12:E13) | Total | =SUM(E12:E13) | Total | =GM[Prod.A]+GM[Prod.B] |

| Revenue | | Revenue | | Revenue | |
|---|---|---|---|---|---|
| Products | 2007 | Products | 2007 | Products | 2007 |
| Product A | 327 | Product A | 327 | Product A | $327 |
| Product B | 100 | Product B | 100 | Product B | $100 |
| Total | =SUM(E18:E19) | Total | =SUM(E18:E19) | Total | =Rev[Prod.A]+Rev[Prod.B] |

| "Never" a good approximation | Good approximation when revenues are roughly the same for all products | Exactly correct in all cases, given adequate data |
|---|---|---|

FIG. 10

Gross Margin pct
Split by Formula

| Products | 2007 |
|---|---|
| Product A | =GM[Prod.A] / Rev[Prod.A] |
| Product B | =GM[Prod.B] / Rev[Prod.B] |
| Total | =(GM[Prod.A]+GM[Prod.B]) / (Rev[Prod.A]+Rev[Prod.B]) |

Gross Margin

| Products | 2007 |
|---|---|
| Product A | $280 |
| Product B | $47 |
| Total | =GM[Prod.A]+GM[Prod.B] |

Revenue

| Products | 2007 |
|---|---|
| Product A | $327 |
| Product B | $100 |
| Total | =Rev[Prod.A]+Rev[Prod.B] |

FIG. 11

| Numerical Example | Formulas |
|---|---|

Revenue
Combine by Plus

| | April | May | June | Q2 | | April | May | June | Q2 |
|---|---|---|---|---|---|---|---|---|---|
| Revenue | $110 | $115 | $135 | $360 | Revenue | 110 | 115 | 135 | =B9+C9+D9 |

FIG. 12

| Numerical Example | Formulas |
|---|---|

Assets
Combine by Last

| | April | May | June | Q2 | | April | May | June | Q2 |
|---|---|---|---|---|---|---|---|---|---|
| Assets | $110 | $115 | $135 | $135 | Assets | 110 | 115 | 135 | =D26 |

FIG. 13

| Numerical Example | | | | | Formulas | | | | |
|---|---|---|---|---|---|---|---|---|---|
| Revenue Split by Proportion | | | | | Revenue Split by Proportion | | | | |
| | April | May | June | Q2 | | April | May | June | Q2 |
| Revenue | $120 | $120 | $120 | $360 | Revenue | =K9/3 | =K9/3 | =K9/3 | 360 |
| Revenue Split by Interpolate-0 | | | | | Revenue Split by Interpolate-0 | | | | |
| | April | May | June | Q2 | | April | May | June | Q2 |
| Revenue | $60 | $120 | $180 | $360 | Revenue | =R9*(1/6) | =R9*(2/6) | =R9*(3/6) | 360 |
| Revenue Split by Interpolate | | | | | | Revenue Split by Interpolate | | | |
| | Q1 | April | May | June | Q2 |
| Revenue | $240 | $100 | $120 | $140 | $360 |

| | Q1 | April | May | June | Q2 |
|---|---|---|---|---|---|
| Revenue | 240 | =U9/3+ (Y9-U9)*(1/6) | =U9/3+(Y9-U9)*(2/6) | =U9/3+(Y9-U9)*(3/6) | 360 |

FIG. 14

| Numerical Example | | | | | Formulas | | | | |
|---|---|---|---|---|---|---|---|---|---|
| Assets Split by Replicate | | | | | Assets Split by Replicate | | | | |
| | April | May | June | Q2 | | April | May | June | Q2 |
| Assets | $360 | $360 | $360 | $360 | Assets | =K26 | =K26 | =K26 | 360 |
| Assets Split by Interpolate-0 | | | | | Assets Split by Interpolate-0 | | | | |
| | April | May | June | Q2 | | April | May | June | Q2 |
| Assets | $120 | $240 | $360 | $360 | Assets | =R26*(1/3) | =R26*(2/3) | =R26*(3/3) | 360 |
| Assets Split by Interpolate | | | | | See below | | | | |
| | Q1 | April | May | June | Q2 |
| Assets | $240 | $280 | $320 | $360 | $360 |

See above

| | Q1 | April | May | June | Q2 |
|---|---|---|---|---|---|
| | | Assets Split by Interpolate | | | |
| Assets | 240 | =AB26+(AF26-AB26)*(1/3) | =AB26+(AF26-AB26)*(2/3) | =AB26+(AF26-AB26)*(3/3) | 360 |

FIG. 15

| Sales Units | | | | Price | | | | Revenue | | |
|---|---|---|---|---|---|---|---|---|---|---|
| Products | 2008 | 2009 | | Products | 2008 | 2009 | | Products | 2008 | 2009 |
| Product A | 10 | 12 | | Product A | $1.00 | $1.00 | | Product A | $10 | $12 |
| Product B | 90 | 105 | | Product B | $5.00 | $5.14 | | Product B | $450 | $540 |
| B1 | 45 | 45 | | B1 | $4.00 | $4.00 | | B1 | $180 | $180 |
| B2 | 45 | 60 | | B2 | $6.00 | $6.00 | | B2 | $270 | $360 |
| Total | 100 | 117 | | Total | $4.60 | $4.72 | | Total | $460 | $552 |
| Shaded boxes contain input data. | | | | Shaded boxes contain input data. | | | | | | |

FIG. 16

| | | Sales Units | |
|---|---|---|---|
| | B | C | D |
| | Products | 2008 | 2009 |
| 6 | Product A | 10 | 12 |
| 7 | Product B | =SUM(C8:C9) | =SUM(D8:D9) |
| 8 | B1 | 45 | 45 |
| 9 | B2 | 45 | 60 |
| 10 | Total | =C6+C7 | =D6+D7 |

Shaded boxes contain input data.

| | | Price | |
|---|---|---|---|
| | G | H | I |
| | Products | 2008 | 2009 |
| 6 | Product A | 1 | =H6 |
| 7 | Product B | =M7/C7 | =N7/D7 |
| 8 | B1 | 4 | =H8 |
| 9 | B2 | 6 | =H9 |
| 10 | Total | =M10/C10 | =N10/D10 |

Shaded boxes contain input data.

| | | Revenue | |
|---|---|---|---|
| | L | M | N |
| | Products | 2008 | 2009 |
| 6 | Product A | =H6*C6 | =I6*D6 |
| 7 | Product B | =SUM(M8:M9) | =SUM(N8:N9) |
| 8 | B1 | =H8*C8 | =I8*D8 |
| 9 | B2 | =H9*C9 | =I9*D9 |
| 10 | Total | =M6+M7 | =N6+N7 |

FIG. 17

| Sales Units | | |
|---|---|---|
| Products | 2008 | 2009 |
| Product A | =10 | =12 |
| Product B | =Units[B1,2008]<br>+Units[B2,2008] | =Units[B1,2009]<br>+Units[B2,2009] |
| B1 | =45 | =45 |
| B2 | =45 | =60 |
| Total | Units[A,2008]<br>+Units[B, 2008] | Units[A,2008]<br>+Units[B, 2008] |

Combine = 'plus'

Shaded boxes contain input

| Price | | d-formula = prev() |
|---|---|---|
| Products | 2008 | 2009 |
| Product A | =$1.00 | =prev() |
| Product B | =Rev[B,2008]<br>/ Units[B,2008] | =Rev[B,2008]<br>/ Units[B,2008] |
| B1 | =$4.00 | =prev() |
| B2 | =$6.00 | =prev() |
| Total | =Rev[Total,2008]<br>/Units[Total,2008] | =Rev[Total,2008]<br>/Units[Total,2008] | c-formula = Rev / Units

Shaded boxes contain input data.

| Revenue | | |
|---|---|---|
| Products | 2008 | 2009 |
| Product A | =Price[A, 2008]<br>*Units[A, 2008] | =Price[A, 2009]<br>*Units[A, 2009] |
| Product B | =Rev[B1,2008]<br>+Rev[B2, 2008] | =Rev[B1,2009]<br>+Rev[B2, 2009] |
| B1 | =Price[B1, 2008]<br>*Units[B1, 2008] | =Price[B1, 2009]<br>*Units[B1, 2009] |
| B2 | =Price[B2, 2008]<br>*Units[B2, 2008] | =Price[B2, 2009]<br>*Units[B2, 2009] |
| Total | =Rev[A,2008]<br>+Rev[B, 2008] | =Rev[A,2009]<br>+Rev[B, 2009] |

Combine = 'plus'

FIG. 18

| Numerical Table | Spreadsheet Formulas | Avar Formulas |
|---|---|---|
| Operating_Exp | Operating_Exp | Operating_Exp |

| Departments | |
|---|---|
| Marketing | $100 |
| Sales | $100 |
| Total | $200 |

| Departments | |
|---|---|
| Marketing | 100 |
| Sales | 100 |
| Total | =B7+B8 |

| Departments | |
|---|---|
| Marketing | =100 |
| Sales | =100 |
| Total | =Op_Exp[Marketing]+Op_Exp[Sales] |

FIG. 19

| Numerical Table | Spreadsheet Formulas | Avar Formulas |
|---|---|---|
| Operating_Exp_Fix | Operating_Exp_Fix | Operating_Exp_Fix |
| <table><tr><td>Departments</td><td>Dept2</td><td></td></tr><tr><td>Marketing</td><td></td><td>$100</td></tr><tr><td>Sales</td><td>N America</td><td>$50</td></tr><tr><td></td><td>International</td><td>$50</td></tr><tr><td></td><td>Total</td><td>$100</td></tr><tr><td>Total</td><td></td><td>$200</td></tr></table> | <table><tr><td>Departments</td><td>Dept2</td><td></td></tr><tr><td>Marketing</td><td></td><td>100</td></tr><tr><td>Sales</td><td>N America</td><td>=C17/2</td></tr><tr><td></td><td>International</td><td>=C17/2</td></tr><tr><td></td><td>Total</td><td>100</td></tr><tr><td>Total</td><td></td><td>=G14+G17</td></tr></table> | <table><tr><td>Departments</td><td>Dept2</td><td></td></tr><tr><td>Marketing</td><td></td><td>=100</td></tr><tr><td>Sales</td><td>N America</td><td>=fix(100)/2</td></tr><tr><td></td><td>International</td><td>=fix(100)/2</td></tr><tr><td></td><td>Total</td><td>=Op_Exp[N Amer]<br>+Op_Exp[Intl]</td></tr><tr><td>Total</td><td></td><td>=Op_Exp[Marketing]+<br>Op_Exp[Sales]</td></tr></table> |

FIG. 20

| Numerical Table | Spreadsheet Formulas | Avar Formulas |
|---|---|---|
| Operating_Exp_Var | Operating_Exp_Var | Operating_Exp_Var |
| <table><tr><td>Departments</td><td>Dept2</td><td></td></tr><tr><td>Marketing</td><td></td><td>$100</td></tr><tr><td>Sales</td><td>N America</td><td>$100</td></tr><tr><td></td><td>International</td><td>$100</td></tr><tr><td></td><td>Total</td><td>$100</td></tr><tr><td>Total</td><td></td><td>$200</td></tr></table> | <table><tr><td>Departments</td><td>Dept2</td><td></td></tr><tr><td>Marketing</td><td></td><td>100</td></tr><tr><td>Sales</td><td>N America</td><td>=G26</td></tr><tr><td></td><td>International</td><td>=G26</td></tr><tr><td></td><td>Total</td><td>100</td></tr><tr><td>Total</td><td></td><td>=G23+G26</td></tr></table> | <table><tr><td>Departments</td><td>Dept2</td><td></td></tr><tr><td>Marketing</td><td></td><td>=100</td></tr><tr><td>Sales</td><td>N America</td><td>=var(100)/2</td></tr><tr><td></td><td>International</td><td>=var(100)/2</td></tr><tr><td></td><td>Total</td><td>=Op_Exp[N Amer]<br>+Op_Exp[Intl]</td></tr><tr><td>Total</td><td></td><td>=Op_Exp[Marketing]+<br>Op_Exp[Sales]</td></tr></table> |

AUTOMATICALLY GENERATING FORMULAS BASED ON PARAMETERS OF A MODEL

BACKGROUND

This description relates to automatically generating formulas based on parameters of a model.

Various types of application software can be used for analytical computations for a given application such as business or engineering. For example, software such as spreadsheets, modeling software, business intelligence platforms, and database software can be used for building analytical models and performing associated computations on application data.

Spreadsheets allow a user to manage data within cells of the spreadsheet and analyze the data by populating cells with formulas that can refer to values in other cells and perform operations and functions on those values. In some spreadsheet software, data records from sources such as a "flat table" within the spreadsheet or from an external database source, for example, can be analyzed in a "pivot table" within the spreadsheet. A flat table has columns representing fields labeled across a top row and a series of rows representing individual records having values for the different fields. In one example of a pivot table a left-most column has different values or ranges of values for a first field (e.g., products or regions), and a top-most row has different values or ranges of values for a second field (e.g., time periods such as months), and each cell at the intersection of given values of the first and second fields (e.g., a given product and a given month) represents a value for a third field (e.g., revenue) computed based on an aggregation of the records for the given values of the first and second fields (e.g., sum of revenue from all records representing transactions for a given product in a given month). The pivot table can also include subtotals for multiple rows or columns (e.g., revenue for a given quarter). The fields represented in the pivot table can be easily swapped.

Modeling software allows a user to define variables that can be used in mathematical expressions and can be assigned a single value for a scalar variable, or multiple values for a variable associated with a dimension such as time. Expressions using these variables can be computed and the results presented as graphical representations such as tables having rows and columns similar to a spreadsheet, with a given series of cell values being computed based on expressions evaluated at different values of the time dimension. Some modeling software can also generate spreadsheets as output.

SUMMARY

In one aspect, in general, a computer-based method includes automatically generating an output formula from an input formula using one of multiple methods determined by types of one or more parameters associated with the input formula and a dimensional operation associated with a dimension of at least a first parameter; and storing the automatically generated output formula or presenting a representation based on the automatically generated output formula using a user interface.

Aspects can include one or more of the following features.

The method further includes storing specifications of a plurality of parameters, including a specification of the first parameter, in which each of at least some of the specifications associates a type with a corresponding parameter, where the type indicates one of multiple methods for automatically generating a formula according to a dimensional operation associated with a dimension of the corresponding parameter.

The method further includes generating multiple output formulas from the input formula, each output formula corresponding to a different segment of the dimension.

Automatically generating the output formula includes generating the output formula from the input formula for a combination of multiple segments of the dimension.

The method further includes generating an output formula from the input formula for a segment of the dimension.

Automatically generating the output formula includes generating multiple output formulas from the input formula for different subsegments of the segment of the dimension.

The method further includes generating a first set of formula data from the input formula for a first set of one or more segments of the dimension.

Automatically generating the output formula includes processing the first set of formula data according to the method indicated by the type to generate a second set of formula data from the input formula for a second set of one or more segments of the dimension different from the first set of one or more segments of the dimension.

The automatically generated output formula includes a formula in a cell of a spreadsheet generated based on the second set of formula data for the second set of one or more segments of the dimension.

The dimension corresponds to a quantity over which interval arithmetic is defined.

The dimension corresponds to time.

The first set of one or more segments includes multiple non-overlapping ranges of the quantity, and the dimensional operation associated with the dimension includes combining one or more of the ranges into at least one combined range of the quantity in the second set of one or more segments.

The first set of one or more segments includes at least one range of the quantity, and the dimensional operation associated with the dimension includes splitting at least one range into multiple non-overlapping ranges of the quantity in the second set of one or more segments.

Automatically generating the output formula includes determining one of multiple valid ways to apply the method indicated by the type to generate the second set of formula data based at least in part on feedback from a user.

The dimension is associated with a hierarchy that corresponds to a graph of nodes having a tree structure where each node represents a segment of the dimension, and the segment represented by a given parent node is based on a combination of the segments represented by the child nodes of the parent node.

The dimensional operation corresponds to generating formula data for segments of the dimension represented by a first level in the hierarchy based on one or more input formulas for segments of the dimension represented by a second level in the hierarchy different from the first level.

The first parameter has a value defined according to an input formula that includes a first set of one or more parameters that each depend on the dimension.

The dimensional operation associated with the dimension includes generating a second set of one or more parameters based on the first set of one or more parameters.

Automatically generating the formula includes applying the input formula to the second set of one or more parameters.

In another aspect, in general, a computer-readable medium has stored therein instructions for causing a computer to: automatically generate an output formula from an input formula using one of multiple methods determined by types of one or more parameters associated with the input formula and a dimensional operation associated with a dimension of at least a first parameter; and store the automatically generated output formula or presenting a representation based on the automatically generated output formula using a user interface.

In another aspect, in general, a computer-based method includes automatically generating an output formula from a parameter that depends on at least one dimension associated with a hierarchy. The parameter specifies at least a first input formula that determines values for one or more levels of the hierarchy and a second input formula different from the first input formula that determines a combination of multiple values from a given level of the hierarchy for a different level of the hierarchy. The method includes storing the automatically generated output formula or presenting a representation based on the automatically generated output formula using a user interface.

Aspects can include one or more of the following features.

The hierarchy corresponds to a graph of nodes having a tree structure where each node represents a segment of the dimension, and the segment represented by a given parent node is based on a combination of the segments represented by the child nodes of the parent node.

The first input formula is associated with a corresponding node.

The first input formula determines a value of the corresponding node if the corresponding node is a leaf node or of a subordinate node if the corresponding node is not a leaf node.

The second input formula is associated with a corresponding node.

The parameter specifies one of multiple default operators for performing a dimensional operation that includes combining segments represented by child nodes of a parent node.

The second input formula determines a combination of values of child nodes of the corresponding node in place of the specified default operator.

The second input formula determines a value for the corresponding node if the corresponding node is a leaf node and no other formula determines a value for the corresponding node.

The second input formula determines a value for the corresponding node based on a combination of values of child nodes of the corresponding node that are added in a dimensional operation that includes splitting the segment represented by the corresponding node into multiple segments.

The segments have a predetermined ordering.

The segments correspond to ranges of a quantity over which interval arithmetic is defined.

The first input formula is associated with a first level of the hierarchy and the second input formula is associated with a second level of the hierarchy different from the first level.

The first input formula determines a value for at least one leaf node.

The second input formula determines a combination of values of child nodes of a parent node at the second level.

The first input formula and second input formula are associated with the same non-leaf node.

The method further includes determining values for child nodes of the non-leaf node so that the combination determined by the second input formula is consistent with a value determined by the first input formula.

The method further includes determining a value for the non-leaf node based on the combination determined by the second input formula even if a value determined by the first input formula is different from the combination determined by the second input formula.

In another aspect, in general, a computer-readable medium has stored therein instructions for causing a computer to: automatically generate an output formula from a parameter that depends on at least one dimension associated with a hierarchy, where the parameter specifies at least a first input formula that determines values for one or more levels of the hierarchy and a second input formula different from the first input formula that determines a combination of multiple values from a given level of the hierarchy for a different level of the hierarchy; and store the automatically generated output formula or presenting a representation based on the automatically generated output formula using a user interface.

In another aspect, in general, a medium bearing information enables automatically generating an output formula from a parameter and storing the automatically generated output formula or presenting a representation based on the automatically generated output formula using a user interface. The information includes: data for at least one dimension associated with a hierarchy; and data that specifies at least a first input formula that determines values for one or more levels of the hierarchy and a second input formula different from the first input formula that determines a combination of multiple values from a given level of the hierarchy for a different level of the hierarchy.

In another aspect, in general, a method includes enabling a user to enter information to specify a parameter that depends on at least one dimension associated with a hierarchy, the information including at least a first input formula that determines values for one or more levels of the hierarchy and a second input formula different from the first input formula that determines a combination of multiple values from a given level of the hierarchy for a different level of the hierarchy; and automatically generating an output formula from at least one of the specified input formulas.

Aspects can have one or more of the following advantages.

The techniques described herein enable a user (or "modeler") to build a model without being required to choose and manually implement many design features. For example, modelers are not required to manually indicate for every formula how to perform combine or split operations on Analysis Variables over segments of a dimension, as described in more detail below.

Modelers do not need to spend a substantial amount of time making simple repetitive design choices and implementing them in software code at the level of individual spreadsheet cells. Automating the generation of output formulas from input formulas based on types, for example, saves modelers' time and reduces the potential for errors.

The following research study estimates are examples of reliability problems that can occur in spreadsheet models that are used for company financial reporting and for decision support.

Spreadsheets contain errors in 1% to 5% of all formula cells.

About 90% of moderate sized financial spreadsheets contained an error of at least 5%.

About 5-25% of decision-making spreadsheets contained an error large enough to affect the decision at issue.

The error rates observed in implementations of analytical models are typical of error rates found for similar tasks across many domains. Error rates for simple manual tasks are about 0.5%. Error rates for tasks that involve logical thinking, such as writing computer programs, are around 5%.

The "warn-and-choose" system described herein enables the detection and management of ambiguities in prototype code that is submitted to a software automation system that writes more explicit code. By "more explicit" is meant that the automation system explicitly adds functional operators (such as the Combine and Split operators) in appropriate places in the submitted code so that modeler does not have to be concerned with them. The "warn-and-choose" system focuses on ambiguities that arise in the human-accessible code and that arise from the logic of the application or model.

The characteristics of spreadsheets may dissuade modelers from implementing improvements in their models that they know in principle how to build. These drawbacks may include: (1) the large number of manual operations that impact productivity and reliability; (2) the proliferation of unique cell formulas, one per cell, to express one concept for many cells; (3) the use of cell addresses in formulas whose meaning is not obvious from inspection, instead of named symbolic variables; (4) the need to expend much effort altering sheet layout when a modeler wants to change the logic of a model. Therefore modelers building very complex models either "satisfice" (that is, accept a model of adequate quality instead of doing the best they know how) or switch from spreadsheets to programming tools that require more advanced programming skills. Reducing the manual operations, enabling modelers to edit model logic without having to heavily manually edit the layout of the spreadsheet, and replacing cell formulas with symbolic formulas would all improve the cost-benefit tradeoffs in favor of building in spreadsheets the best models that modelers know how to build.

The large amount of manual work on cell formulas and cell addresses can make it more difficult for modelers to collaborate in building spreadsheet models. Therefore, some spreadsheet modeling projects may not allow more than one principal author who can change the fundamental formulas of a model. Reducing the manual operations, enabling modelers to edit model logic without having to heavily manually edit the layout of the spreadsheet, and replacing cell formulas with symbolic formulas would facilitate collaboration of modelers in building spreadsheet models.

Other features and advantages of the invention will become apparent from the following description, and from the claims.

DESCRIPTION OF DRAWINGS

FIGS. 5-20 are tables showing formulas associated with Analysis Variables.

DESCRIPTION

1 Overview

Figure 1:
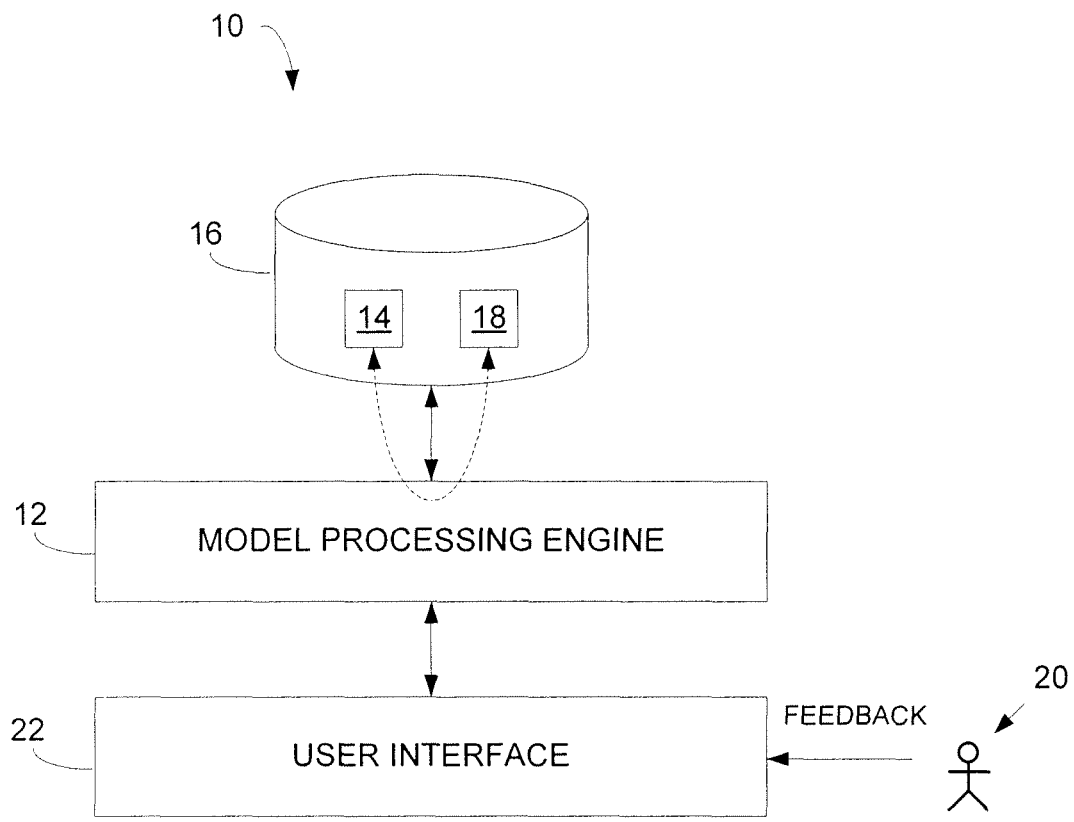
FIG. 1 is a schematic diagram of components in a modeling system.

Referring to FIG. 1, a modeling system 10 includes model processing engine 12 that Processes model specification data 14 in a data store 16 (e.g., including volatile and/or non-volatile computer-readable storage media) to generate a model summary file 18. A user 20 interacts with the model processing engine 12 using a user interface 22 to develop the model specification 14 including the names and characteristics of parameters of an application model called "Analysis Variables"that can be used in formulas, and that represent various quantities of the given application model(e.g., financial quantities in a business application model). The model processing engine 12 is configured to automatically generate the model summary file 18 that can be independently examined and manipulated by the user 20, such as a spreadsheet that contains cell with formulas corresponding to the dataq in the model specification data 14. For example, the model processing engine 12 automatically generates "output formulas"within the model summary file 18 (e.g., formulas in terms of cells of a spreadsheet such as A2-B1) based on"input formulas"from the model specification data 14(e.g., formulas in terms of Analysis Variables such as $Gross_{13}$ Margin=Revenue−Cost).

The model summary file 18 includes specifications of Analysis Variables. Each Analysis Variable (or"Avar") is named parameter of the model that can be configured to depend on any Number of dimensions. An Avar has a data structure that can store multiple formulas for Calculating values of the Avar, as described in more detail below. Avars can be referenced by Name in formulas for other Avars. A variety of operations associated with a dimension of an Avar can be performed, resulting in new values of the Avar or new formulas for computing values of the Avar.

Examples of operations associated with a dimension include scaling the segments of a dimension up or down according to an associated hierarchy, and adding or removing a segment or an entire dimension. In some cases, some of the formulas in the model summary file 18 are automatically generated based on "Operational Types" associated with the variables. When the engine 12 is performing an operation associated with a dimension of one of the variables in a formula, an Operational Type associated with the variable can be used to indicate one of multiple methods for generating an output formula according to the operation associated with the dimension (also called a "dimensional operation"). For example, each Operational Type can correspond to a different method for combining or splitting a time-dependent quantity when a time dimension is being combined (e.g., months combined into quarters) using a "Combine" operator or split (e.g., quarters split into months) using a "Split" operator, as described in more detail below.

Any of a variety of computer systems (e.g., desktop, distributed, client/server) can be used to execute the processes of the model processing engine 12 and provide the components of the modeling system 10. The user interface 22 includes input interfaces (e.g., keyboard or mouse) and output interfaces (e.g., display, coupled storage medium, or network connection). The generated model summary file 18 can be stored in the data store 16 and/or provided to the user 20 over the user interface 22. In some cases, the model processing engine 12 generates the model summary file 18 based on a feedback from a user 20 received over the user interface 22. In some cases, the model processing engine 12 generates the model summary file 18 without feedback from the user 20. The model processing engine 12 is also able to incorporate changes made by the user 20 to the model summary file 18 back into the model specification data 14.

The model specification data 14 can be arranged according to any of a variety of formats. In an example shown in FIG. 2, the model specification data 14 includes individual Analysis Variable specifications 200 that each define characteristics of an Analysis Variable (e.g., "A") that has been assigned for use in a given application model. The defined characteristics can include dimensions (e.g., time, location, etc.), and Types including Operational Type, Data Type (e.g., integer, floating point, string, date, Boolean, etc.), and Format Type (e.g., currency, decimal, percent, text, etc.) of the corresponding variable. An Analysis Variable can have a single "node" or multiple "nodes," as described in more detail below. A node allows a user to provide an element value, or one or more formulas for calculating an element value, or both. An element value can be a number or other type of data that has an explicit value. An element value may be generated directly from a formula associated with a node of an Avar, or an element value may be generated after a formula associated with a node has been used to automatically generate an "output formula" such as a formula in a spreadsheet worksheet 202. In some cases, the formula associated with a node may refer to other Avars. If the other Avars have multiple nodes, a particular node is specified by indexing into a dimension of the Avar. When an Avar formula is evaluated, the value of the resulting element is computed based on the values of any referenced variables.

The dimensions of a variable allow a variable to take on different values for different segments of the dimension. A dimension can be a "quantitative dimension" that represents values or intervals of a continuous or discrete quantity over which interval arithmetic is defined. A dimension can be a "segmentation dimension" represents an ordered or unordered set of segment values. For example, the set of all countries forms a geographic "Location" dimension which can be used to segment revenues, expenses, headcount, etc. of a business. The countries may be ordered alphabetically, or by size or any pre-determined or computed ordering. A quantitative or segmentation dimension can be hierarchical. For example, the Location dimension can include continental regions where each country belongs to a continental region. Other examples include product group/product family/product, continent/region/country, division/department, job level/job title, and asset type. A time dimension is a quantitative dimension that can also be associated with a kind of hierarchy, for example, with years divided into quarters, and quarters divided into months, etc.

As a user 20 builds a model, the user can view various aspects of the model such as model formulas grouped by their interrelationships and/or by Operational Types or Categories, for example. After the model is built, the model processing engine 12 can output the model summary file 18 as, for example, one or more spreadsheet workbooks that include the model, expressed in terms of formulas including the appropriate cell addresses automatically generated according to the model specification data 14. Thus, the system 10 reduces the manual cell-level tasks demanded of the user, when constructing and maintaining a model, which can sometimes be time-consuming and error-prone.

Figure 2:
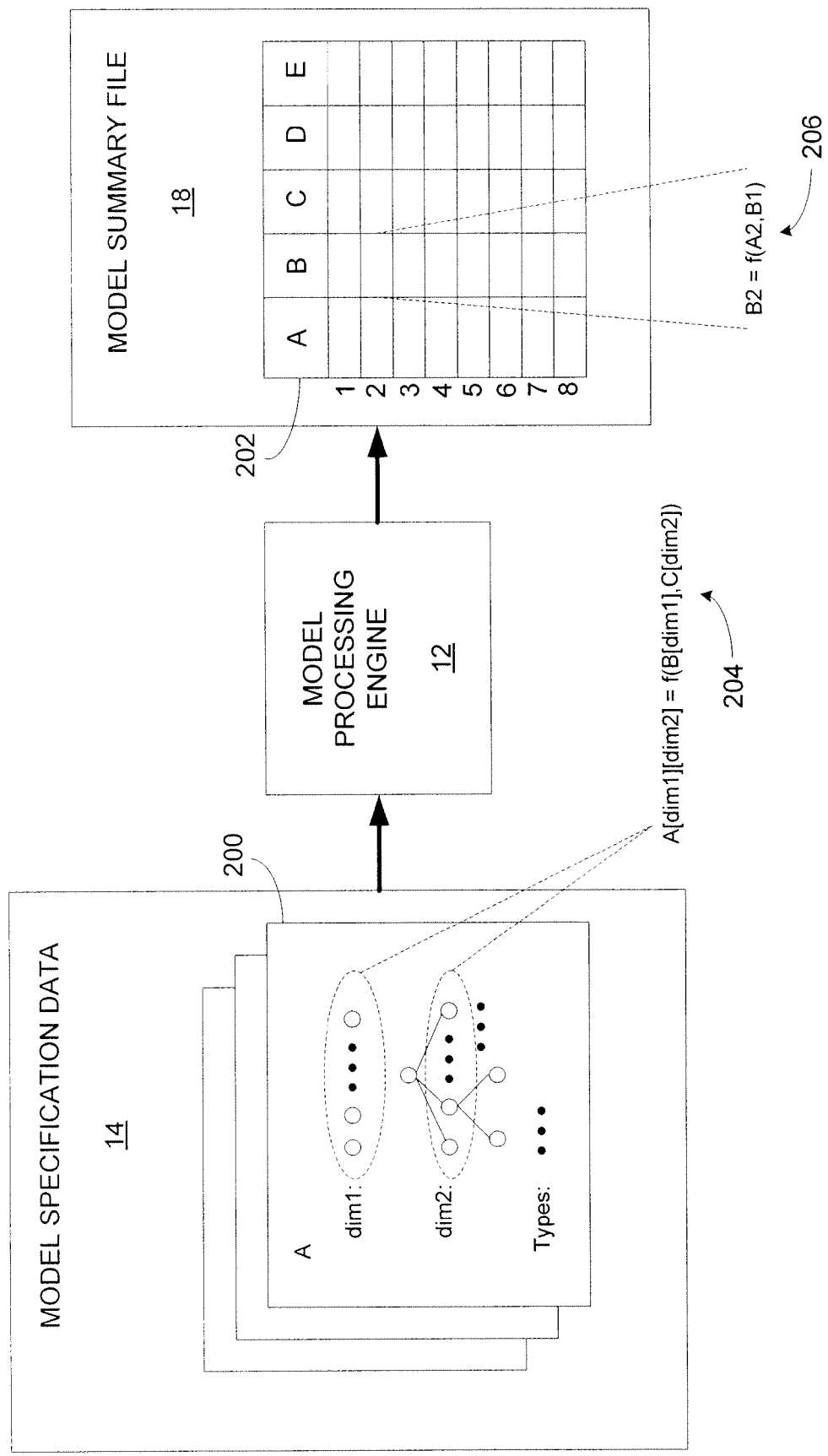
FIG. 2 is a schematic diagram of model specification data and a model summary file.

In FIG. 2, an exemplary input formula 204 is the right hand side of an assignment statement for Avar A that depends on dimensions dim1 and dim2. The input formula 204 is a function of Avars "B" and "C." In this example, B depends on dim1 and C depends on dim2. The model processing engine 12 automatically generates an output formula 206 according to a dimensional operation being performed and Operational Types of one or more of A, B, and C.

The system 10 provides automated methods that can be applied to lower-level design decisions, such as combining and splitting Analysis Variables over segments, and coarsening or refining a time unit of a time dimension of a model. The automated methods also enable automatic layout and formatting of the model summary file 18, optionally based on layout information provided by the user 20. Layout information can include information such as names of worksheets, table groupings, section headers, and formats.

Some automated methods apply an operation over a dimension of an Analysis Variable. An automated Combine Operation over a dimension (also called rollup), for example, enables combining information that is available at a fine level of detail to obtain information at a coarser level of detail. For example, if an Avar formula is defined for calculating monthly element values, the processing engine 12 automatically generates a formula for calculating an annual value according to the defined Operational Type for the Analysis Variable. An automated Split operation over a dimension, for example, enables splitting information that is available at a coarse level of detail to obtain information at a finer level of detail. For example, if an Avar formula is defined for calculating year-end element values, the processing engine 12 automatically generates formulas for calculating approximate monthly values according to the defined Operational Type for the variable.

The system includes high-level types, to which Analysis Variables can be assigned based on what the Avar represents in a given application, such as Avars that represent financial concepts (e.g., revenue, asset value, cost per unit, interest rates, gross margin, etc.). A given Analysis Variable may be associated with a high-level type that assigns a corresponding Operational Type, Data Type, and Format Type to that Analysis Variable. Operational Types can be directly assigned to an Analysis Variable, without use of any high-level type.

The Operational Type that is assigned to a variable provides information about how to perform various operations on a formula that defines the variable's values over a given dimension, such as Combine or Split operations over a dimension. In an example with a time dimension, in which the operation involves changing the unit of time from months to quarters, the processing engine 12 determines from a first Operational Type for an Analysis Variable representing revenue that a quarterly revenue value is computed by adding three monthly revenues. For another operation that also involves changing the unit of time from months to quarters, the processing engine 12 determines from a second Operational Type for a variable representing asset value that a quarterly asset value is computed by using the value for the last month in the quarter. For another operation that also involves changing the unit of time from months to quarters, the processing engine 12 determines from a third Operational Type for a variable representing an interest rate that a quarterly interest rate value is computed by compounding three monthly interest rates.

In an example in which the dimension corresponds to countries, and the operation involves combining over countries, the processing engine 12 determines from a first Operational Type for variables representing revenue and unit sales that the total revenue and unit sales are computed by summing country revenues and country unit sales respectively. From a second Operational Type for a variable representing average selling price, the processing engine 12 may determine that a total average selling price over all countries is computed by summing revenue across countries and unit sales across countries, and dividing the resulting total revenue by the resulting total unit sales.

The modeling system 10 includes pre-defined Operational Types associated with various common financial parameters, and provides a mechanism for a user to provide an Operational Type that can be assigned to a variable for any arbitrary method for operating on an expression, for a given operation over a dimension. In some implementations, if an Analysis Variable has multiple dimensions, the modeling system 10 allows different Operational Types to be assigned to the Analysis Variable for each dimension.

One Operational Type that can be assigned to a variable for indicating how to perform a dimensional operation, such as Combine or Split, is the "formula" Operational Type. The formula Operational Type can be assigned to an Avar that has a value defined according to a formula that is a function of one or more arguments. When an operation is going to be performed over a dimension, such as a Combine or Split operation and processing engine 12 determines that an Avar has the formula Operational Type, the processing engine 12 performs the operation on each argument according to any assigned Operational Type of that argument. If an argument is a variable with an assigned Operational Type, then the operation is performed on that argument according to that assigned Operational Type. If an argument is not a variable with an assigned Operational Type (including a default Operational Type), then no operation needs to be performed on that argument.

For example, an Avar v has a value defined according to a function v=f(x,y) and is assigned the formula Operational Type. In this example, each of the arguments x and y is an Avar that depends on a dimension and has an assigned Operational Type. At a given value of the dimension, the arguments x and y and the variable v take on corresponding values (e.g., $v_{Q1}=f(x_{Q1},y_{Q1})$ for a first quarter of a time dimension, and $v_{Q2}=f(x_{Q2},y_{Q2})$ for a second quarter of a time dimension). The processing engine 12 performs a dimensional operation, which includes generating a second set of arguments based on a first set of arguments according to the respective Operational Types of the arguments. For a Split operation over time, the first set of arguments may be $x_{Q1}$ and $y_{Q1}$ for a first quarter, and the second set of arguments may be $x_{M1}$, $y_{M1}$, $x_{M2}$, $y_{M2}$, $x_{M3}$, $y_{M3}$ for the three months of the first quarter. For a Combine Operation over time, the first set of arguments may be $x_{Q1}$, $y_{Q1}$, $x_{Q2}$, $y_{Q2}$, $x_{Q3}$, $y_{Q3}$, $x_{Q4}$, $y_{Q4}$ for all four quarters of a year, and the second set of arguments may be $x_{Y1}$, $y_{Y1}$ for the year. The Splitting or Combining operator is applied according to the Operational Type assigned to the arguments. After the dimensional operation has been applied to generate the appropriate arguments, the processing engine 12 applies the function to generated arguments. For the Split example, the Split Avar values for the three months of the quarter would be $v_{M1}=f(x_{M1},y_{M1})$, $v_{M2}=f(x_{M2},y_{M2})$, $v_{M3}=f(x_{M3},y_{M3})$. For the Combine example, the value of the combined Avar value for the year would be $v_{Y1}=f(x_{Y1},y_{Y1})$. The formula Operational Type avoids choosing a method for performing a dimensional operation for an Avar, but instead "passes the buck" to the arguments of a defining function of the Avar, then plugs the resulting arguments into the defining function.

A "warn-and-choose" mechanism enables the processing engine 12 to warn a user when an input (e.g., a formula) they have provided has more than one valid interpretation in terms of the automated operations performed by the processing engine 12. The processing engine 12 warns the user that this formula needs his attention; presents the user with one or more choices of interpretation; and allows the user to select one of the choices or to introduce his own interpretation. If an input has no valid interpretation then the processing engine may generate an error message.

In some implementations, the warn-and-choose mechanism includes one or more of the following features.
Identify computational situations for which an automation process might be able to return several computational expressions that represent several reasonable and nonequivalent interpretations.
Assign a safety level to each possibly ambiguous computational situation. The user can specify one of several levels of safety for catching and addressing ambiguous situations, so he is warned about only the most seriously ambiguous situations, or all ambiguous situations, or something in between.
For each potentially ambiguous computational situation, identify a list of reasonable and nonequivalent interpretations that the user might intend and that the automated processing system might return.
Issue a warning to the user for the appropriate computational situations. Accompany most or all warnings with a list of potentially reasonable and nonequivalent interpretations of the input computational situation.
Enable the user to specify the interpretation he wants used in each ambiguous situation that is presented to him.
Alter the computational model to employ the interpretation that the user told the system to use.
Retain a record of the potentially ambiguous situations and users' choices of interpretations, so that user can re-run the list of potentially ambiguous situations and review the choices that user made.

The warn-and-choose mechanism enables automation of computational processes to proceed even when some fraction of the computation situations cannot be resolved in a fully automated manner. In situations that are not ambiguous, the automation process delivers its full benefits of increased reliability and productivity. In ambiguous situations, the automation process with the warn-and-choose system will be more reliable and easier to use than relying on users to identify all the ambiguities and manually code solutions for them.

2 Analysis Variables

Analysis Variables store and organize the values that are the heart of a model. Analysis Variables play a role analogous to tables of cells in spreadsheets, but also provide a richer structure that enables features associated with entities in other conceptual and/or computational contexts, such as accounts in financial accounting, and variables and arrays in languages such as Basic. This section and following sections include examples for an implementation of the modeling system 10 used for an accounting model.

In the following example, an Analysis Variable named "Revenue" captures the revenue of a company by product line, by geographic location and by time as follows.

TABLE 1

"Revenue" ($ millions)

| Product | Region | Continent | 2008 | 2009 | 2010 |
|---|---|---|---|---|---|
| Grand Total | | | $360 | $400 | $442 |
| Product A | | | $225 | $248 | $273 |
| | Americas | | $100 | $110 | $121 |
| | | N America | $70 | $78 | $87 |
| | | S America | $30 | $32 | $34 |
| | Eurasia | | $125 | $138 | $152 |
| Product B | | | $135 | $152 | $169 |
| | Americas | | $60 | $67 | $75 |
| | | N America | $40 | $45 | $50 |
| | | S America | 20 | 22 | $25 |
| | Eurasia | | $75 | $85 | $94 |

Table 1 shows different values that can be generated based on the formulas defined by the Revenue Avar. In this example, the Avar is associated with three dimensions, where each of product line, geographic location and time corresponds to a dimension. In this example, the modeling system 10 provides built-in functionality to define a series of elements over the time dimension called a "Time Series" based on given a start time, end time, and time grain specifying a unit of time between elements in the series. The modeling system 10 also provides built-in functionality to define any number of segmentation Dimensions (or "SDimensions") that can be associated with a hierarchy.

Figure 3A:
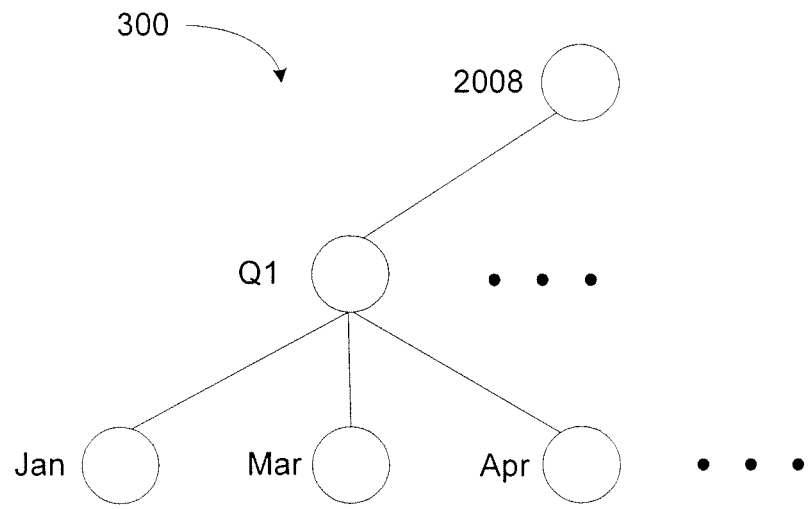
FIG. 3A is a diagram of a tree that represents a hierarchy associated with a dimension.
Figure 3B:
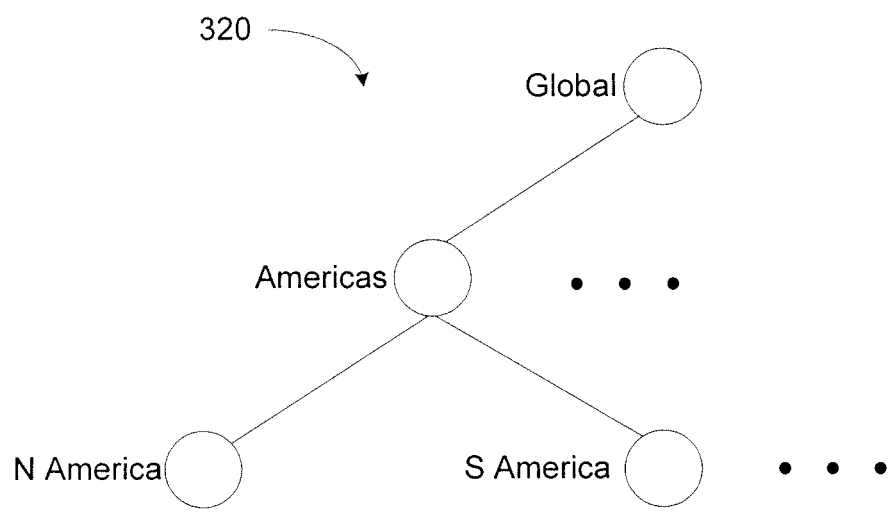
FIG. 3B is a schematic diagram of a data structure for storing Analysis Variable specifications.

FIG. 3A shows a portion of a hierarchy 300 associated with a Time Series, and FIG. 3B shows a portion of a hierarchy 320 associated with an SDimension. Each of the hierarchies 300 and 320 corresponds to a graph of nodes having a tree structure where each node represents a segment of the dimension. A "child node" is a node directly connected to a "parent node" that is higher in the hierarchy (i.e., closer to the root node). A "leaf node" is a node without any child nodes. A "subordinate" node to a given node is child or lower descendent node to the given node (e.g., a child of a child, or a child of a child of a child, etc.). The segment represented by a given parent node is based on a combination of the segments represented by the child nodes of the parent node. For the Time Series, a time interval segment for the first quarter Q1 node is based on a combination of the time interval segments for the three months represented by the three child nodes. For the SDimension, a discrete segment for the Americas node is based on a combination of discrete segments for North America and South America represented by two child nodes.

The data structure for storing formulas and other data associated with an Avar is arranged to store a different input formula and/or data values for each of multiple levels of the hierarchy. For example, the data structure can be arranged as an "OLAP cube" of nodes with Time Series and SDimensions that additionally has

- formulas associated with its nodes, of two kinds (described in more detail below):
  - "D-Formulas" for computing values at the associated node (if the associated node is a leaf node) and at subordinate leaf nodes (if the associated node is not a leaf node), and
  - "C-Formulas" for computing values of rollup at the associated node or over multiple subordinate nodes, and for computing values at subordinate leaf nodes if there is no D-Formula for those leaf nodes.
- Operational Types for choosing Combine and Split operators for computing values based on a Combine operation corresponding to change in hierarchy level closer to the root of the tree, or a Split operation corresponding to a change in hierarchy level closer to the leaves of the tree.

In abstract mathematical terms,

- The data structure of an Avar is a formed by the Cartesian product of none, one or more SDimensions and none, one or more Time Series. The nodes of the Avar are the nodes of the Cartesian product of SDimensions and Time Series. A leaf node of the Avar is a Cartesian product of one leaf node from each SDimension and Time Series. Thus, the data structure of an Avar is a hypercube, with one dimension for each SDimension and Time Series of the Avar.
- Each SDimension forms a hierarchical tree with one or more levels of nodes. The entire Cartesian product of SDimensions forms a fully-ordered set. For any hierarchical ordering of the SDimensions of the Avar, the entire Cartesian product of SDimensions is a fully-ordered set. If the Avar has a Time Series, it is not normally included in the hierarchical tree structure of the Avar, and the nodes at each Item/segment of the Time Series have the hierarchy and ordering determined by the SDimensions.
- Each node of the Avar can contain one or more formulas, including numerical data as a special case. The hierarchy and ordering of nodes (for each time segment if there is a Time Series) permits defining propagation rules for formulas and other properties of a node to subordinate nodes. D-Formulas (explained in more detail below) associated with a node can be evaluated at that node if it is a leaf node, or at any subordinate leaf node. C-Formulas (explained in more detail below) can be evaluated at any subordinate "non-leaf node" (a node that is not a leaf node), and at any subordinate leaf node that does not have a D-Formula available for evaluation according to the propagation rules.

FIGS. 4A-4F show an exemplary user interface layout for viewing and editing characteristics of an Avar.

Figure 4A:
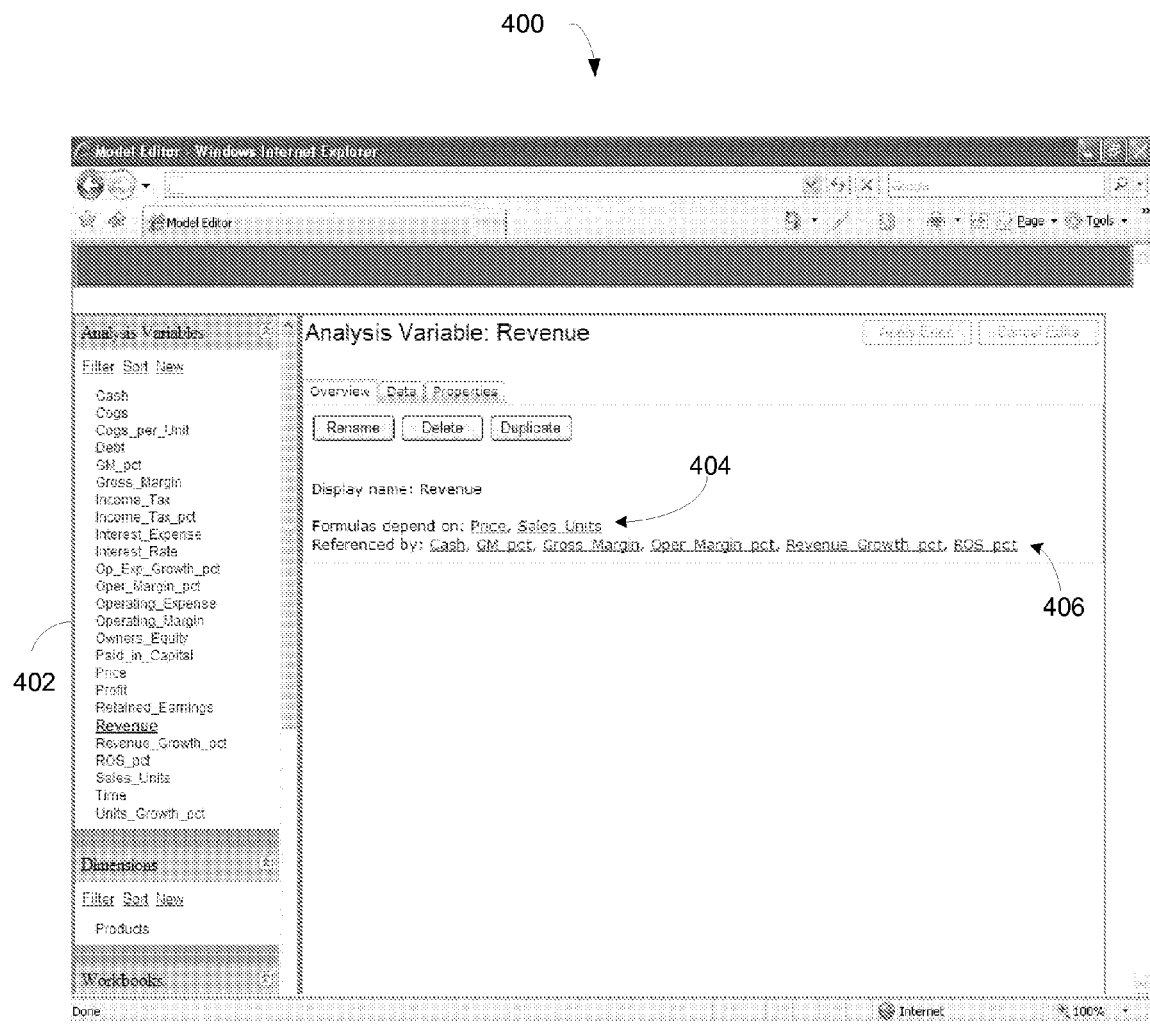
FIGS. 4A-4F are screem o;;istrations of a user interface for specifying Analysis Variables.

FIG. 4A shows an Overview Tab of an Avar Editor 400 that appears after a user selects an Avar for viewing. At the top is the name of the Avar selected for viewing and/or editing. The Avar selected in this example is named "Revenue." The Overview Tab includes:

- A column 402 at the left that includes a list of all the Avars in the current model, from which the modeler selects one Avar to review and edit.
- Near the top, buttons for Renaming the Avar (and all its occurrences in the model), Deleting the Avar, and Duplicating (creating a second copy of) the Avar with another name.
- A list 404 of Avars that appear in any of the formulas that define the values of the Avar.
- A list 406 of Avars in whose formulas this Avar appears.

Figure 4B:
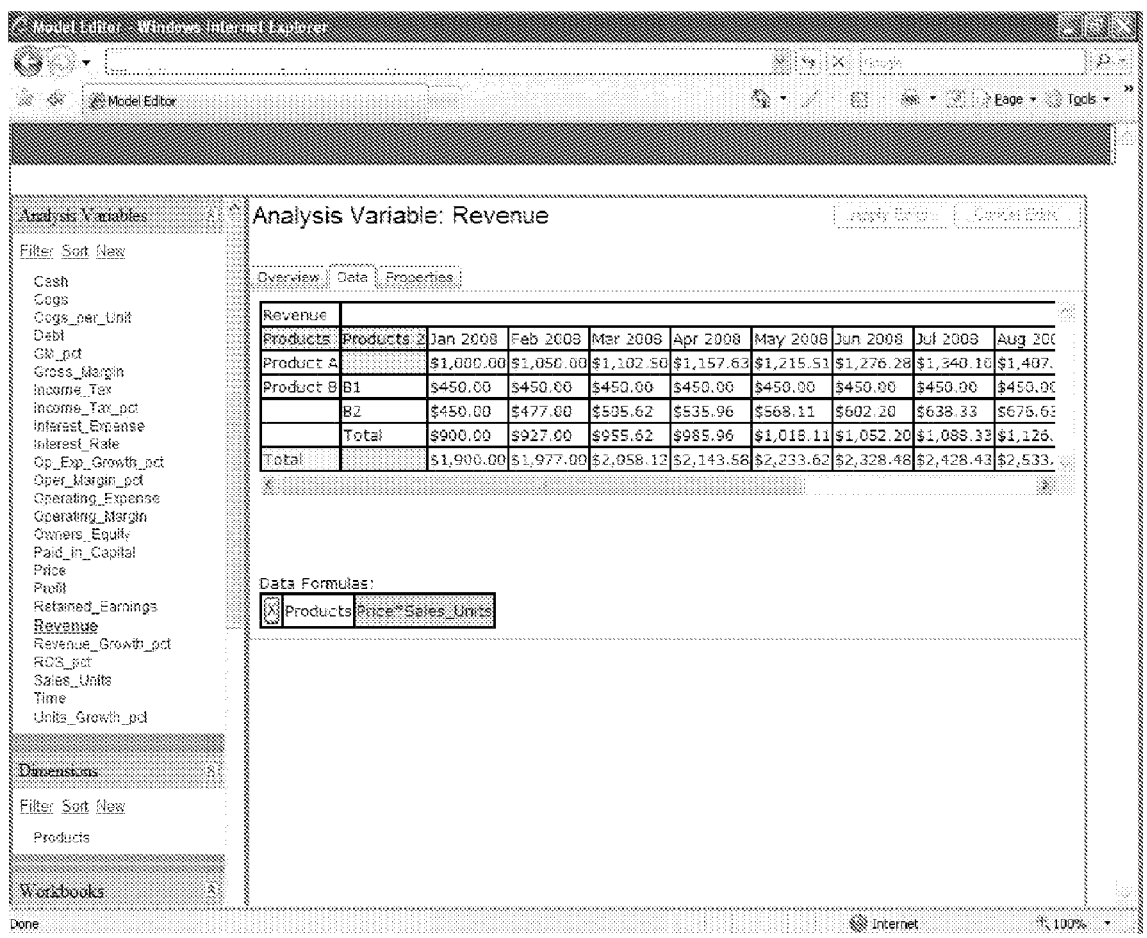

FIG. 4B shows a Data tab of the Avar Editor 400 that serves as an Avar Data Viewer This tab displays a data table of the Avar, and formulas that define the values in the data table. The Data tab includes:

- The top row displays the Time Series of the Avar.
- The left two columns display the SDimension called "Products" which has two levels of hierarchy, one shown in each column.
- The Items (or "segments") in the first level of the Products SDimension, called "Product A" and "Product B".
- The Items in the second level of the Products SDimension, B1 and B2, both of which are subordinate to Product B.
- The numerical values in the cells of the Avar table.
- At the bottom, a list of all the C-Formulas and D-Formulas that are used to define the values in the Avar table. In this case, there is only one master D-Formula, "Revenue=Price *Sale_Units."
- Pink shading indicates cells that contain input information defined by the user. In this case, the master formula shades pink several cells that are associated with the rollup cell of the table.
- Yellow shading indicates a cell that has been selected with the cursor. A mouse can move a cursor to other cells or off the table. Keyboard gestures enable the cursor to navigate the cells in the table.
- If a cell is selected (as in FIG. 4B), orange shading indicates which formulas affect that cell. If a formula is selected, then orange shading indicates which cells have values that are affected by the selected formula.
- Scroll bars for horizontal and vertical scrolling.

Figure 4C:
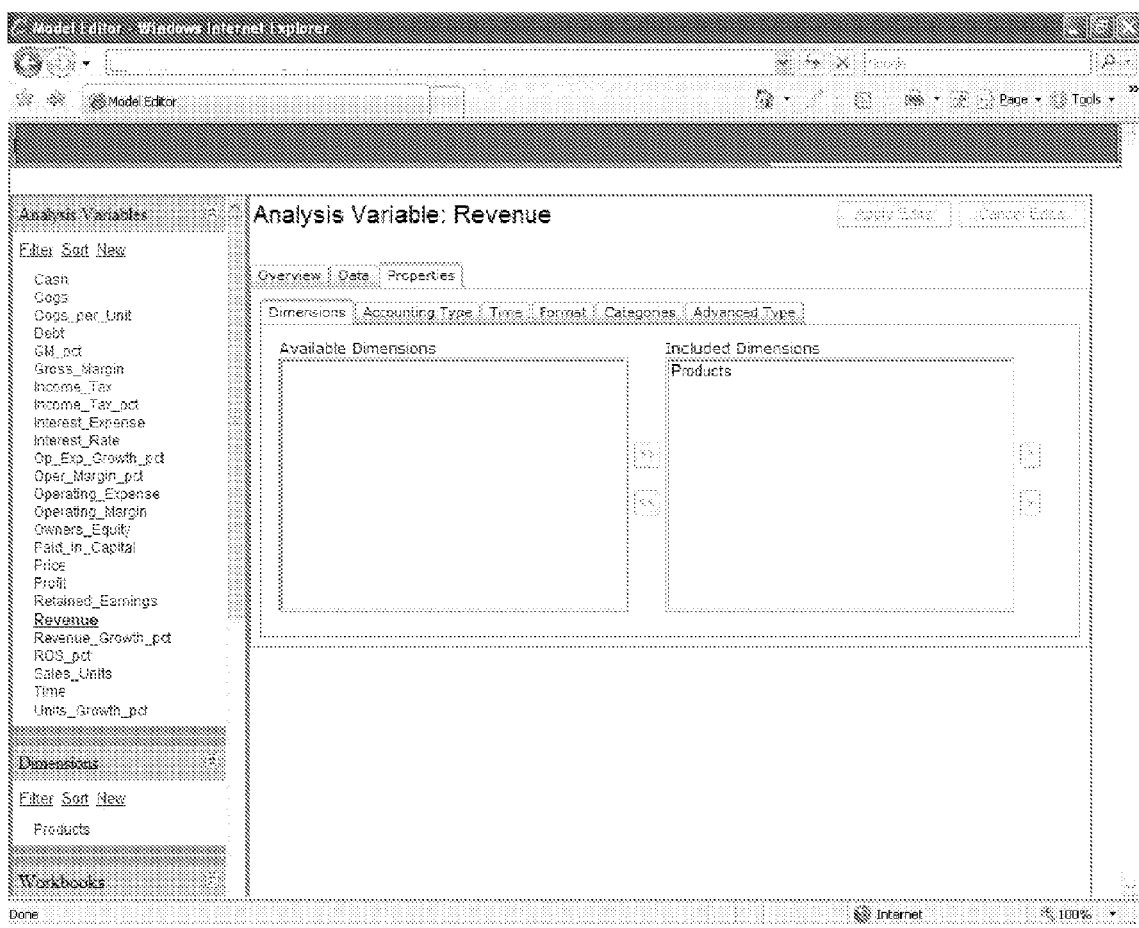

FIG. 4C shows a Properties tab of the Avar Editor that enables a user to define and edit properties including Types associated with the selected Avar.

The Dimensions sub-tab shown enables users to add or remove SDimensions from the Avar. The Dimensions sub-tab includes:

- On the left, a list of "Available Dimensions" that can be associated with the Avar.
- On the right, a list of "Included Dimensions" that are already associated with the Avar.
- In the middle, left and right arrow buttons between the two lists for moving items back and forth between the two lists.

On the right, up and down buttons for changing the order of the SDimensions, which affects display and the SDimension hierarchy.

At the lower left, this tab also includes a "Dimensions" section in which the user can define a new SDimension using the button "New".

Figure 4D:
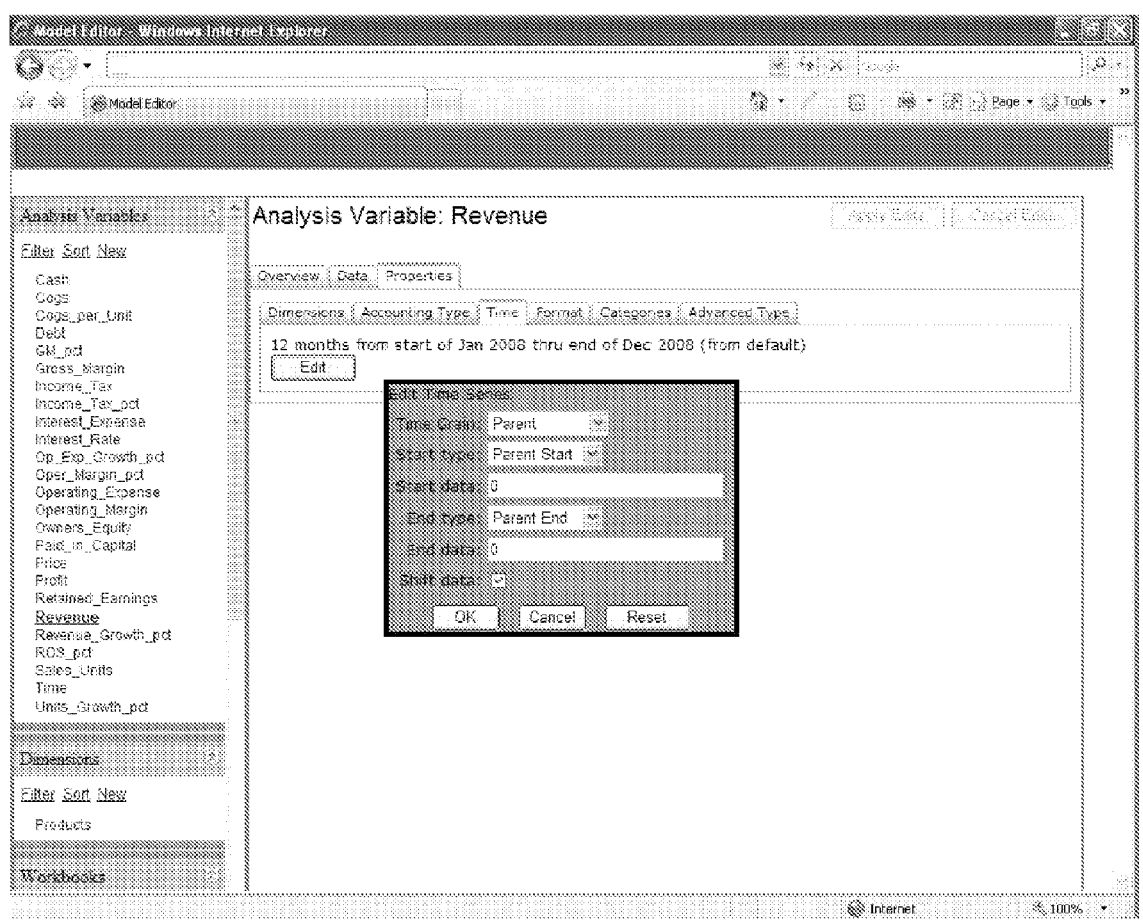

FIG. 4D shows a time sub-tab of the Properties tab.

This sub-tab displays the editor that enables users to modify the Time Series associated with the Avar, and includes:

Near the top, a one-line summary of the Time Grain (months) the number of time periods (12), the start time and the ending time of the Time Series for this Avar.

The name of the parent Time Series from which this information is derived (default).

The button "Edit" that opens the blue dialog box in the middle of the screen.

In the dialog box, list boxes for the Time Grain and parental origin of the Start time;

a type-in box for the offset of the Avar's start time in number of time periods from the parent start time. If the Start time is not based on a parent Time Series, this type-in box is used to explicitly specify a start time.

a list box for the parental origin of the end time.

a type-in box for the and offset of the Avar's end time from the parent end time, in number of time periods from the parent start time. If the End time is not based on a parent Time Series, this type-in box is used to explicitly specify an end time.

A check box for the user to specify whether to shift the input data forward or backward in time if the start time is altered.

Figure 4E:
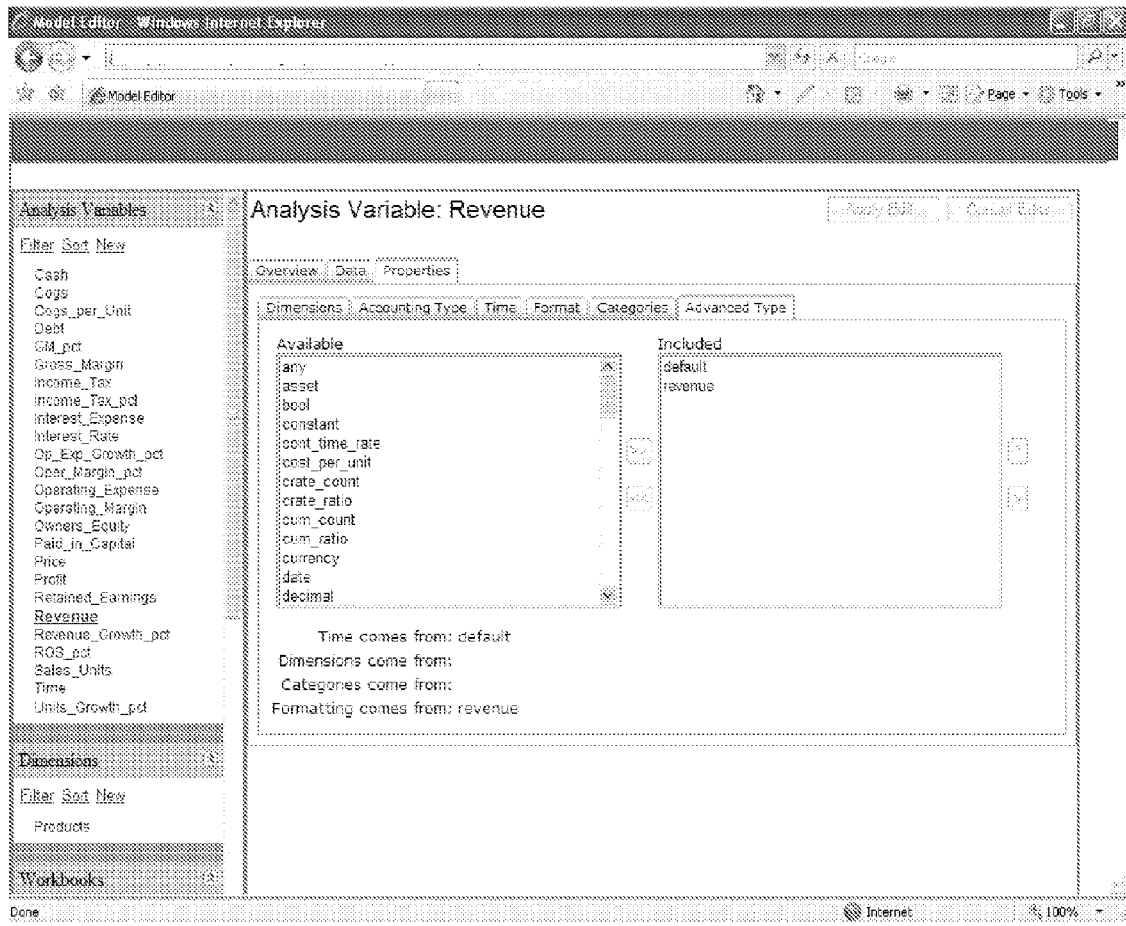

FIG. 4E shows an "Advanced Type" sub-tab of the Properties tab.

This sub-tab displays the Advanced Avar Type Editor that enables modelers to specify Avar Types that drive various automated computation processes. This sub-tab includes:

On the left, a list of "Available" Avar Types which are not already assigned to the Avar, and which could be added to the Avar.

On the right, a list of "Included" Avar Types which are already assigned to the Avar.

In the middle, left and right arrow buttons between the two lists for moving items back and forth between the two lists.

At the bottom, information about the sources from which the Avar inherits various properties, such as Time Series and Format Type.

Figure 4F:
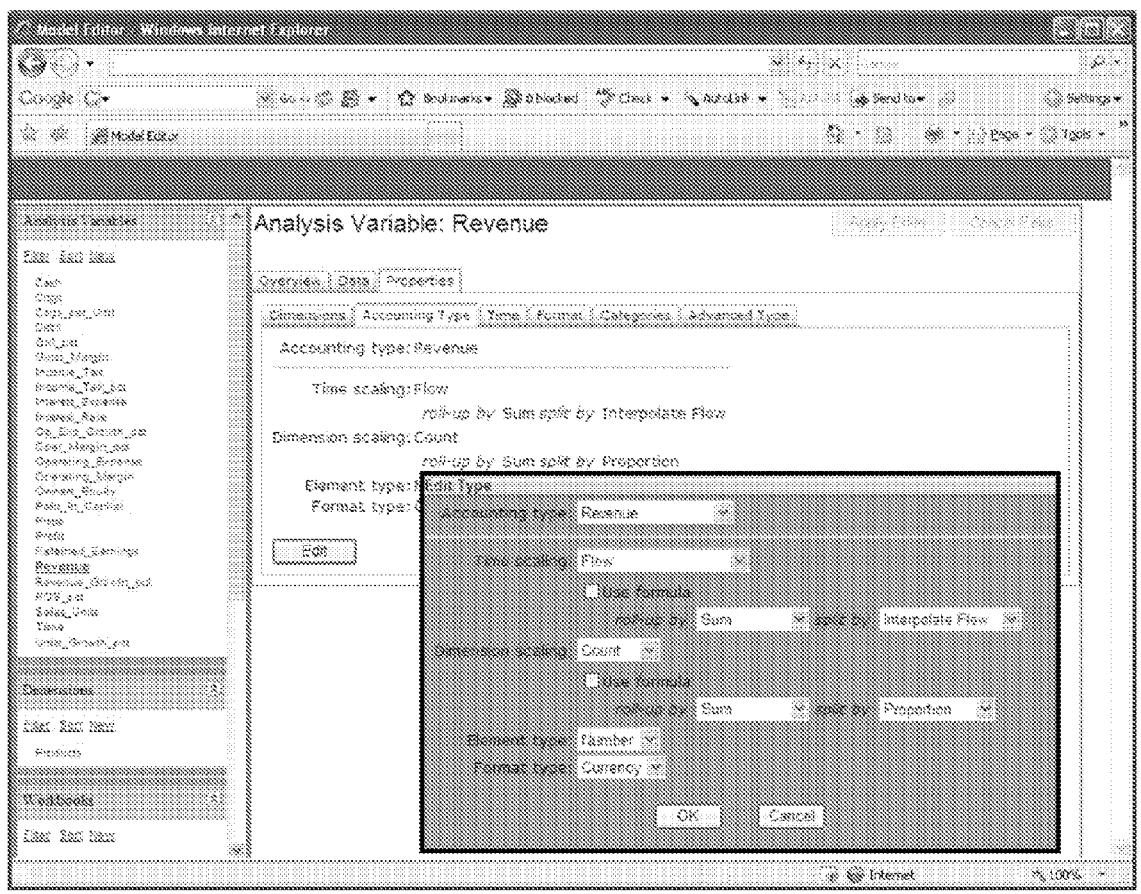

FIG. 4F shows an "Accounting Type" sub-tab of the Properties tab.

This sub-tab displays the Avar Accounting Type Editor that enables modelers to specify Avar Types that drive various automated computation processes. This sub-tab includes:

A listing of the Accounting Types, Scaling Types, Element Type and Format Type selected for this Avar.

A dialog box for editing the Accounting Types and subordinate Types.

Red font in the tab and red background in the dialog box if any subordinate Type overrides a component of a superior Type (not activated in this figure).

2.1 Time Series of Analysis Variables

Analysis Variables can take on different values at different points in time or in different intervals of time. For example, revenues are normally measured as an amount per interval of time, such as the revenue between the start of January 1 and the end of December 31 for a calendar year; assets are normally measured at a specific point in time, such the end of the last day of the year.

When defining an Analysis Variable, a user is able to specify a Time Series for that Analysis Variable. A Time Series has a starting time, an ending time, and a Time Grain (a unit of time for successive time segments, e.g., months or years or quarters) for specifying values of the Analysis Variable. An Analysis Variable can be declared "constant" with respect to time, so that a value for the Analysis Variable does not depend on a time dimension.

In the example of Analysis Variable "Revenue" above, the Time Series has starting time Jan. 1, 2008, ending time Dec. 31, 2010, and Time Grain of one year.

A Time Series can be used by many Analysis Variables, so the Time Series may be implemented as an independent structure in the model, which is used as a property of an Analysis Variable.

2.2 Segmentation Dimensions of Analysis Variables

When defining an Analysis Variable, a user can specify zero, one or more segmentation dimensions (or "SDimensions") by which the values of the Analysis Variable can be segmented into parts. Each segmentation dimension can have several levels arranged in a hierarchy. The example Analysis Variable "Revenue" depicted above has two segmentation Dimensions that might be named "Product Line" and "Location", where "Product Line" has one level named "Product" and "Location" has two levels (called "Region" and "Continent"). Association with a specific segment of a segmentation dimension is not necessarily required for all elements of an Analysis Variable, for example, when a customer places a company-wide order and the vendor cannot track in which region or continent the products are used the Location SDimension may remain undefined for data corresponding to that order.

An SDimension can be used by many Analysis Variables, so the SDimension may be implemented as an independent structure in the model, which is used as a property of an Analysis Variable. This architecture facilitates re-use and centralized editing of SDimensions.

2.3 Formulas in Analysis Variables

The values of particular nodes or collections of nodes in an Analysis Variable are given by formulas that can apply to multiple nodes. Formulas are used to compute node values from the values of nodes of other Analysis Variables. In a spreadsheet, cell formulas are used to compute cell values from the values of other cells. Thus, if an Analysis Variable is compared with a cell in a spreadsheet, one feature of Analysis Variables that provides more power is the ability to define multiple formulas for the Analysis Variable associated with different nodes or collections of nodes. If an Analysis Variable is compared with a table in a spreadsheet with rows and columns of cells, one feature of Analysis Variables that provides more power is the ability to define one formula for multiple nodes. In spreadsheets, typically a user defines a different formula for each cell in a table, because the addresses of the predecessor data vary with the address of the cell being evaluated. In the model specification data 14, a user can use one formula to define values for a range of nodes, even for the entire Analysis Variable, which can be used to automatically generate the different formulas for cells of a spreadsheet output as a model summary file 18.

In the following example, an Analysis Variable Gross Margin can be defined as Revenue minus Cost of Goods. Assuming Revenue and Cost of Goods are already defined as Avars, Gross Margin can be defined using a single formula that implicitly takes into account a time dimension using a defined Time Series. In a spreadsheet, Gross Margin can be defined in a table using different formulas in different cells to explicitly account for a time dimension. Table 2 shows an example of defining Gross Margin as a table in a spreadsheet, and as an Analysis Variable in the model specification data 14.

TABLE 2

Defining Gross Margin as a table in a spreadsheet
Gross Margin

| Location | 2006 | 2007 |
|---|---|---|
| Americas | =B9-B15 | =C9-C15 |
| Eurasia | =B10-B16 | =C10-C16 |
| Total | =SUM(B3:B4) | =SUM(C3:C4) |

Defining Gross Margin as an Analysis Variable in the model specification data
Avar Editor

| Avar Name | Gross Margin |
|---|---|
| Dimensions | Location |
| Time Series | Model Time |
| Accounting Type | Margin |
| Formula | Revenue - Cost of Goods |

Some differences between spreadsheets and the model specification data 14 storing Avars in this example are listed below in Table 2.

TABLE 3

Comparison of Formulas in Spreadsheets and in Avars

| Spreadsheet tables | Avars |
|---|---|
| Tables must be laid out with the correct number of columns, rows and header labels. | Specify the SDimensions and unique Time Series for an Analysis Variable. These automatically lay out columns, rows, and header labels. SDimensions and Time Series can be re-used in many Analysis Variables. |
| Formulas are expressed in terms of cell addresses (or named cell regions). A different formula is usually needed for each cell. (Often involves fixing cell addresses with '$' and copying.) | Formulas are expressed in terms Analysis Variable names. One Formula suffices for a range of nodes, or even the entire Analysis Variable. |
| Separate spreadsheet formulas must be entered for subtotals and totals. | Totals (called rollups) are handled automatically based on Operational Types. |

When defining a model with dozens of Analysis Variables, or editing a model to include finer segmentation or altered Time Series, or trying to audit a model for reliability, the advantages of automatically generating a spreadsheet using Avars over manually editing a spreadsheet are usually compelling.

3 Types and Categories for Analysis Variables

In an exemplary implementation of the modeling system 10, the model specification data 14 includes a hierarchical set of pre-defined variable types. For an exemplary accounting model, high-level types called Accounting Types that are convenient for modeling accounting data because their names and meanings are drawn from familiar accounting concepts. For example, a variable can be assigned Accounting Type "Revenue," "Asset," or any of a variety of other Accounting Types. Assigning an Accounting Type to an Analysis Variable automatically assigns the appropriate "Base Types" to the variable. The modeling system 10 also provides categories to which Analysis Variables can also be assigned for managing properties of groups of Analysis Variables.

3.1 Accounting Types of Analysis Variables

In business and financial applications, typical Analysis Variables can be classified into Accounting Types such as the following.

Income statement variables:
  Revenue, cost of goods, gross margin, operating expense, operating margin, interest income or expense, income tax, net income, dividends. These Analysis Variables count currency amounts that are measured per unit of time.
  Supporting variables such as unit sold, units produced, full-time equivalent employees. These Analysis Variables count objects or non-currency amounts that are measured per unit of time.
  Supporting variables such as prices, margin percents (gross margin percent, operating margin percent, return on sales percent), tax rates, cost of goods per unit produced or sold. These are ratios of two variables that count something and do not themselves count currency or units.
Balance sheet variables:
  Assets, liabilities, owners' equity. These Analysis Variables count currency amounts that are measured at a point in time.
  Supporting variables such as end of year employee headcount, Inventory Units. These Analysis Variables count objects or non-currency amounts that are measured at a point in time.
  Supporting variables such as depreciation life.
Financial ratios:
  Turnover ratios (sales/assets, sales/inventory), Liquidity ratios (current ratio, quick ratio), price-earnings ratio, stock price to book value ratio, rates of return (return on equity, return on assets).
Other variables:
  Growth rates for practically anything, interest rates. These Analysis Variables measure rates per unit time that compound over time periods.

The Accounting Type contains information the enables the model processing engine 12 to automate many routine low-level tasks, such as combining Analysis Variables values over segments including combining segments corresponding to child nodes of a parent node in a hierarchical segmentation Dimension, or combining several smaller time segments (e.g., months) of a Time Series to yield its value over a larger time segment (e.g., a year).

Examples of "Base Data Types" for Analysis Variables, described in more detail below, are Time Operational Types, SDimension Operational Types, Element Types, and Format Types. The Accounting Types provide a convenient way to assign Type information to Analysis Variables in terms of familiar concepts, and to avoid dealing with the Base Types in most cases.

3.2 Layout and Formatting Properties of Analysis Variables

Layout information controls the display of information in on a display of the user interface 22 (e.g., worksheets displayed using a web browser) and in automatically-generated spreadsheets. The specifications of Analysis Variables can store layout and formatting information as described below. Some aspects of laying out an Analysis Variable as a table in a spreadsheet are specified in association with a worksheet layout, and some aspects are specified in association with the Analysis Variables appearing in a displayed worksheet or used to format a worksheet within a generated spreadsheet.

3.2.1 Element and Format Types

Formulas defined by or automatically generated from an Analysis Variable can be evaluated to yield elements of a predetermined type. Analysis Variables can yield elements whose values are of a predefined "Element Type" such as Boolean constants, dates, numbers, or strings, for example. Each Analysis Variable is typically assigned one of these "Element Types". A user can select a Format Type for the elements of an Analysis Variable that controls the format in which the elements are displayed.

The Accounting Types determine certain Format Types for Avar elements, For example, for elements that have the "numbers" Element Type, the Format Types include currency, decimal, and percent. A user can also set the Format Type of an Avar directly in the Avar Editor 400 on the tab "Properties" and the sub-tab "Advanced Types". A user can also control the number of decimal places displayed.

3.2.2 Suppressing Rollup of Values

As an example of defining layout properties of an Avar that may affect what computations are performed in a given model, layout properties can be used to suppress computations that are performed by default. By default, Analysis Variables roll up over segmentation Dimensions. For example:

If revenues are $10 million in each of four sales offices in Europe, then revenue rolls up to a total of $40 million in Europe.

If prices are $20, $22, $22 and $24 in the four sale office in Europe, then the average price is calculated by weighting the office prices with the share of unit sales for each office. If the unit sales for each office are not available (or a user decides for any reason to suppress defining an average European price), then a user can suppress the rollup of revenue over sales offices.

A user can suppress computation of rollup values for an Analysis Variable, for example, using "Norollup" properties. Although Norollup properties are classified as layout properties, they affect computations in the model, since they suppress computation of some of the rollup values.

3.2.3 Categories of Analysis Variables

The Categories assigned to an Analysis Variable can be used for various purposes. There can be predefined categories, such as the following "Input" category, and there can be user-defined categories.

The "Input" Category specifies that the interface for editing an Analysis Variable provides cells declared as "Input" for receiving editable input. For example, the model processing engine 12 can import numerical values from Analysis Variable cells that are declared as "Input" in the model specification data 14. The Input property also causes the cells affected by the input to be displayed in a different color (e.g., medium blue) so that users can easily distinguish the cells that contain values that are independent of the structure of the model.

A user can assign arbitrary Category names to Analysis Variables, and use them to control on which worksheets each Analysis Variable is displayed. These Categories do not necessarily have a role in defining the structure or content of the model, but may help to organize the presentation of the model by controlling characteristics such as display order of Analysis Variables within a worksheet.

In some implementations, the interface for constructing a model includes a Workbook Editor for defining properties of worksheets that are displayed or generated within a spreadsheet model summary file 18. In the Workbook Editor, a user can define which Categories of Analysis Variables appear on each worksheet and the order in which they appear. In the Category Editor, a user determines the order of the Analysis Variables within each Category that controls the order in which Analysis Variables appear within a Category on a worksheet.

3.3 Examples of Accounting Types

The Accounting Types provide a top-level system of types that is simple enough for users to easily set up models, while being complex enough to make the distinctions necessary to drive the automated methods, such as determination of the lower level types that drive computation or layout processes; and, it is sufficiently coarse and stated in sufficiently simple and common terms that the types can be understood by users who have a modest background in basic business finance or accounting, and who have no background in software or computer programming or data types as used by software engineers.

Each Accounting Type provides the processing engine 12 information about how to compute with a given Analysis Variable and how to display its values using appropriate lower level types. For many purposes, a user may only need to use the high-level Accounting Types. Accounting Types provide a simple interface to the Base Types. A user can either assign an Accounting Type to an Analysis Variable, which determines the Base Types, or a user may decide not to assign an Accounting Type and may directly assign the Base Types to that Analysis Variable.

Table 4 shows some of the Accounting Types and corresponding combinations of Base Types specified by the Accounting Type (in this example the specified Base Types include Operational Type and Format Type) and examples of familiar accounting concepts associated with the Accounting Type. Users can also define their own composite types and reuse them for different Avars.

TABLE 4

| Accounting Type | Specified Base Types: | Accounting Examples |
| --- | --- | --- |
| Revenue | flow, count and currency | Revenue |
| Expense | flow, count and currency | Cost of goods, operating expense, depreciation expense, interest expense, income tax expense |
| Margin | flow, count and currency | Gross margin, operating margin, return on sales |
| Margin Pct | stock, ratio and percent | Gross margin %, operating margin %, return |

TABLE 4-continued

| Accounting Type | Specified Base Types: | Accounting Examples |
|---|---|---|
| | | on sales % |
| Asset | stock, count and currency | Accounts receivable, cash, inventory value, plant & equipment, asset valuation |
| Asset Flow | flow, count and currency | Purchase or sale of assets (per period) |
| Liability | stock, count and currency | Accounts payable, debt |
| Liability Flow | flow, count and currency | Purchase or sale of liabilities |
| Equity | stock, count and currency | Paid in capital, retained earnings |
| Equity Flow | flow, count and currency | Purchase or sale of stock, value (per period) |
| Dividend | flow, count and currency | Dividend payment, value (per period) |
| Return Pct | stock, ratio and percent | Return on equity, return on assets, return on capital |
| Turnover | flow, ratio and decimal | asset turnover (revenue/assets), inventory turnover (revenue/inventory) |
| Depreciation Life | stock, ratio and decimal | Depreciation life (expressed in constant unit, e.g. years) |
| Price | stock, ratio and currency | List price, average selling price |
| Cost per Unit | stock, ratio and currency | Cost of good per unit, wages and salaries per time per person |
| Discrete Time Rate | drate, ratio and percent | Discrete interest rates, growth rates |
| Continuous Time Rate | drate, ratio and percent | Continuous interest rates, continuous growth rates |

3.4 Base Types

Each Analysis Variable is assigned Base Types.

The following are examples of Base Types:

Operational Types (to Control Combine and Split Operations on Time Series and SDimensions)

Operational Types determine how Avars Combine and Split with respect to changes of grain with respect to Time Series and segmentation Dimensions (e.g., changes of fineness of segmentation of a quantitative dimension, or changing levels in a segmentation Dimension hierarchy).

Time Operational Types (to Control Combine and Split Operations Over Time Series)

Time Operational Types are related to how values of a variable may depend on a Time Series and include the "Stock" Operational Type (e.g., for Avars that measure a quantity at a point in time, like balance sheet quantities do), the "Flow" Operational Type (e.g., for Avars that measure a quantity for a period of time, like income statement quantities do), and the "Constant" Operational Type, which specifies that the values of the Avar do not depend on the time dimension. A user does not necessarily need to directly assign Operational Types to Avars if the user assigns an Avar an Accounting Type, which also determines the Operational Types.

For example, the Time Operational Type assigned to a Revenue Accounting Type indicates that to Combine revenue values over several time periods, revenues for the separate time periods are added. The Time Operational Type assigned to an Asset Accounting Type indicates that to Combine assets over several time periods, the asset total for the last time period is used.

SDimension Operational Types (to Control Combine and Split Operations Over Segmentation Dimensions)

SDimension Operational Types are related to how values of a variable may depend on segmentation Dimensions and include "Count" Operational Type (e.g., for Avars that count a number of discrete items), and "Ratio" Operational Type (e.g., for Avars that represent a ratio of two quantities), and the "Constant" Operational Type, which specifies that the values of the Avar do not depend on the SDimension.

Analysis Variables can have a combination of a Time Operational Type for an associated Time Series and an SDimension Operational Type for each SDimension. For example, an Avar that has a Time Series and one SDimension can have an Operational Type "Stock, Count" specifying a Stock Time Operational Type and a Count SDimension Operational Type.

Element Types (to Specify the Data Types of Individual Elements of an Analysis Variable)

An Element Type determines the kind of values that may be assigned to an Avar. For example, assigning to an Avar the Element Type "number," "string," "boolean," or "date" indicates that all the values of elements computed from that Avar are either numbers, alphanumeric text strings, Boolean constants, or dates, respectively. Each Accounting Type can have a corresponding Element Type and even for variables that are not assigned a high-level accounting type can be initialized with a default Element Type (e.g., "number"), so a user does not necessarily need to assign one.

Format Types (to Specify the Display Formats for the Elements of an Analysis Variable).

A Format Type indicates how to format the values of the elements of an Analysis Variable for display. The Format Type can determine whether to format the elements as decimal numbers, currency amounts, or a percentages, for example; and the Format Type can determine the number of significant digits to use in a table of numbers, optionally based on characteristics such as the range of sizes of numbers and the frequency distribution of sizes of numbers in the table. For example, The value 0.25 is displayed as 25% using Format Type "percent0," as 0.250 using Format Type "decimal3," and as $0.25 using the Format Type "Currency2".

Revenue and Asset Accounting Types are assigned the "Currency" Format Type, so that revenue and asset Avars are to be displayed using currency symbols and formatting (e.g., $100.00), and may include a variety of sub-types for different kinds of currency and different numbers of decimal places.

The Format Type can affect layout of tables and pages, and formatting options for descriptive headings and text. The formatting of elements of an Analysis Variable may depend on other factors, such as its hierarchy level in a table, and may determine the font size, borders and other formatting characteristics associated with the descriptive headers or numerical elements in the table, and page layout.

3.5 Time Operational Types

The following are examples of Time Operational Types that can be used for Avars that depend on a time dimension. An Avar that depends on time can have a Time Series defined to provide a series of values of the Avar that each represent a quantity for a time period or an instant in time, at a given Time Grain. Changes in the Time Grain can cause variables to scale in ways that are reflected in the following Time Operational Types.

- Time Operational Type "Flow" is assigned to a "flow Avar" that reports a quantity for a particular period of time. Generally, Avars that appear on income statements or cash flow statements are flow Avars. For example, Avars that represent revenue, expenses, and margins may be reported as a currency amount per time period (e.g., month, quarter, year). If the defining time period increases (e.g., months to quarters), then the value of the flow Avar for the new time period increases relative to the value of the flow Avar for any previous time period included within the new time period. For example, the value of a flow Avar that appears on an income statement for the year 2009 is about four times as large (assuming revenue is roughly constant across quarters) as the value of the same Avar on an income statement for the fourth quarter of 2009. A flow Avar has units of measure that include 1/time.

- Time Operational Type "Stock" is assigned to a "stock Avar" that reports a quantity measured at a point in time, without reference to a time period. Generally, Avars that appear on balance sheets (such as assets, liabilities and owners' equity) are stock Avars. For example, Avars that represent assets refer to the amount of assets controlled by a company on a given date. The size of the unit of time (the accounting period) does not affect the magnitude of stock Avars. For example, the value of total assets on a balance sheet for the year 2009 is exactly the same as the value of total assets on a balance sheet for the fourth quarter of 2009 or for the month of December 2009. A stock Avar carries units of measure that do not include time.

- Time Operational Type "Time Rate" is assigned to "time rate Avars" that represent interest rates or growth rates. Under change of the Time Grain, time rate Avars change according to compounding and decompounding formulas. For example, an interest rate of 1% per month translates into an interest rate of 12.68% ($=1.01^{12}-1$), as a Discrete Time Rate Operational Type. A continuous interest rate (often used in investment management) of 1% per month translates into a continuous interest rate of 12.00% ($=\log(\exp(0.1*12))$), as a Continuous Time Rate Operational Type.

- Time Operational Type "Mixed" is typically assigned to ratios of stock and flow Avars. For example, asset turnover is defined as revenues/assets (a ratio of a flow Avar over a stock Avar). Mixed Avars have units of 1/time, and their transformation properties under change of time grain are the same as those for flow Avars.

- If an Avar is assigned Time Operational Type Constant, then its values do not depend on time, and it does not have a Time Series assigned to it.

3.6 SDimension Operational Types

Changes in the fineness of grain of segmentation Dimensions can cause Avars that depend on a segmentation Dimension to scale in ways that are reflected in the following SDimension Operational Types. In the following examples, a Location SDimension is a hierarchical segmentation Dimension that has three continental regions (Americas, Asia, and EMEA) at a first level, and multiple countries within each continental region at a second level. SDimension Operational Types indicate default rules to combine values of an Avar for countries to get values for the continental regions, and to combine values for the regions to get a global total. SDimension Operational Types also provide default rules to Split a global total value for an Avar to get values for the continental regions, and to Split regional values to get country values.

- SDimension Operational Type "Count" is assigned to "count Avars" that count a quantity such as money-denominated and units-denominated quantities. For example, revenue, expense, sales units, net income, employee headcount, assets, liabilities, equity, revenue, are count Avars with respect to a segmentation Dimension.

- SDimension Operational Type "Ratio" is assigned to "ratio Avars" that are defined by ratios of other Avars, such as count Avars. Examples include margin percents (e.g., gross margin %=gross margin/revenue, and return on sales %=net income/revenue); return on assets=profit/assets; actual price=revenue/sale units. For a ratio Avar, decreasing the fineness of segments (e.g., Combining global values into regional values) is more like taking a (weighted) average than it is like adding values. Prices behave in this way. For example, if a product has a global average price of $100, the average price in each of three continental regions is normally close to $100, not $33. For a ratio Avar, increasing the fineness of segments (e.g., Splitting country values to get continental values) is better described by replicating values than by dividing a total into parts. Prices behave in this way. For example, if a product has regional prices of $90, $100 and $110, then the global average price is normally close to $100, and is not close to their sum, $300.

- If an Avar is assigned an SDimension Operational Type "Constant" with respect to the Location Dimension, then its values do not change for different geographic regions. For example, in the formula for compounding interest rate $r[year]=(1+r[month])^{12}-1$, the value 1 is a constant that does not depend on geographic location.

3.7 Examples: Types of Common Analysis Variables

The following are examples of some common Analysis Variables and the Accounting Types and Base Types that are normally assigned to them.

- Asset life is a Stock, Count Avar. Suppose asset life is defined in terms of years. If we express it in quarters, the same life is represented by a number that is four times as large.
    - Compare this behavior with that of a flow Avar like revenue. An annual revenue that is Split into quarters is represented by a number that is one fourth as large as the annual revenue. (If the time Split operator interpolates, then the factor of ¼ is only the average shrinking factor from annual revenue to quarterly revenue).
    - Change of Time Grain does not rescale a stock, count Analysis Variable. Stock, Count Avars should be Time-Combined by formula (and then by Last) and Time-Split by formula (and then by Interpolate).

- Direct labor time is a Flow, Count Avar. Suppose DL_Time is defined in terms of man-days. If we express DL_Time in terms of man-weeks, it is represented by a number that is 20% as large.
    - Compare this behavior with that of a Flow Analysis Variable: changing the time unit from days to weeks causes a Flow, Count variable to be represented by a number that is five times as large.

The remark above about Stock, Count Avars applies here.

Direct labor time per production unit (denoted DL_U) is a Stock, Ratio Avar. Suppose DL_U is defined in terms of man-days per unit. If we express DL_U in terms man-weeks per unit, then it is represented by a number that is 20% as large.

Compare this behavior with that of a flow variable: changing the time unit from days to weeks causes a Flow,Count Analysis Variable to be represented by a number that is five times as large.

Stock, Ratio variables should be Time-Combined by formula (and then by Last) and time-Split by formula (and then by Interpolate).

3.8 Operational Types and Associated Combine and Split Operators

The Operational Type assigned to an Avar determines the Combine and Split operators to be used on values of an Avar when the Time Grain or level of segmentation Dimension is changed. In this accounting example, the Operational Type indicates one of four Combine and Split operators that are to be used over a dimensional operation that changes the grain of either a Time Series or a segmentation Dimension. The following are examples of using the four kinds of operators.

Combine Operator for Avars that Depend on Segmentation Dimensions

Combine Operators combine quantities that are expressed with finer segmentation to quantities that are expressed with less segmentation. Examples: add sales from different countries to get global sales; combine gross margin percentages from different product lines to get a company-wide gross margin percentage.

Split Operator for Avars that Depend on Segmentation Dimensions

Split Operators increase the fineness of segmentation of quantities. Examples: Given global marketing costs, allocate the costs to individual countries or sales regions based on revenues of the regions or GDP of countries.

Combine Operator for Avars that Depend on Time

Combine Operators for time combine quantities that are expressed with finer time segmentation to quantities that are expressed with less segmentation. Examples: Compound several annual growth rates to obtain a composite growth rate for a period of years; combine gross margin percentages for twelve months to obtain a composite gross margin percentage for a year.

Split Operator for Avars that Depend on for Time

Split Operators for time increase the fineness of time segmentation of quantities. Examples: De-compound annual interest rates to obtain monthly interest rates; given estimates of end-of-year corporate assets in a business plan, derive estimates for end-of-month assets.

3.8.1 Time Combine Operators

The following Combine Operators are used to compute the value of an Avar for a larger time period (for a coarser time grain) from the values of the Avar for smaller time periods (for a finer time grain).

TABLE 4

Time Combine Operators

| Operator | Description | Example |
| --- | --- | --- |
| Plus | Add data for smaller time periods to get totals for a larger time period that contains the smaller time periods. | Add quarterly revenues of $220, $240, $260, $280 to get annual revenue of $1,000. |
| Average | Average the values of an Avar for smaller time periods to compute a value for larger time periods. | Given gross margin percent (GM %) for each quarter, compute an estimate of GM % for a year by averaging the quarterly GM % s with equal weights. This is an approximation. (An exact value can be obtained by the "Formula" method if annual gross margin and annual revenue are known.) |
| First | Given data for a series of smaller time periods, compute the value for a larger time period that contains the smaller time periods by taking the value of the first of the smaller time periods. | Given that company assets are $700, $800, $900 and $1,000 at the start of four quarters in a year, the starting assets for the year is the first value, or $700. |
| Last | Given data for a series of smaller time periods, compute the value for a larger time period that contains the smaller time periods by taking the value of the last of the smaller time periods. | Given that company assets are $700, $800, $900 and $1,000 at the close of four quarters in a year, the final assets for the year are the last value, or $1,000. |
| Formula | Given data for a series of smaller time periods, compute the value for a larger time period that contains the smaller time periods by using a formula based on other variables. | Modeler specifies a Combine formula. Example: given gross margin and revenue for each quarter of a year, the gross margin % for the year is sum(gross margin, 4 quarters)/sum(revenue, 4 quarters). |

3.8.2 SDimension Combine Operators

The model processing engine 12 uses the following Combine Operators to compute the value of an Avar for a coarser segmentation Dimension from the values of the Avar for a finer but compatible segmentation Dimension.

TABLE 5

SDimension Combine Operators

| Operator | Description | Example |
| --- | --- | --- |
| Plus | Add values of an Avar from smaller segments to get totals for larger segments that contain the smaller segments. | Add country revenues of $600 for U.S., $200 for Canada, and $200 for Mexico to get North American revenue of $1,000. |

TABLE 5-continued

SDimension Combine Operators

| Operator | Description | Example |
|---|---|---|
| Average | Average the values of an Avar for smaller segments to compute a value for larger segments. | Given gross margin percent (GM %) for each country, compute an estimate of global GM % by averaging the country GM % s with equal weights. This is an approximation. An exact value can be obtained by the "Formula" method if country gross margin and country revenue are known. |
| Formula | Given data for smaller segments in an SDimension, compute the value for a larger segment that contains the smaller segments by using a formula based on other Avars. | Given GM % by country, compute global GM % using the formula GM % = gross margin/revenue. The formula enables you to use country revenues and country gross margins (or GM %) to compute global GM %. |

Time Combine Operators "First" and "Last" do not have analogous SDimension Combine Operators because the items in an SDimension do not generally have a standard ordering.

3.8.3 Time Split Operators

The model processing engine 12 uses the following Split Operators to compute the value of an Avar for smaller time periods (for a finer time grain) from the value(s) of the Avar for larger time periods (for a coarser time grain).

3.8.4 SDimension Split Operators

The model processing engine 12 uses the following Split Operators to compute the value of an Avar for finer segmentation Dimension from the value(s) of the Avar for a coarser segmentation Dimension.

TABLE 6

Time Split Operators

| Operator | Description | Example |
|---|---|---|
| Proportion | Split data for larger time periods by allocating an equal share to each smaller time period contained in larger time periods. | Given annual revenue of $1,000 for one year, compute an estimate of quarterly revenues at $250 per quarter. |
| Interpolate_end | Given values of an Avar A[J] at the end of several larger time periods, estimate values a[j] at the end of smaller time periods by linear interpolation, Formula: $a[J, j] = ((N - j) * A[J - 1] + j * A[J])/N$ (where N = 4 quarters per year) | Given assets of A[1] = $1,000 at the end of the first year and A[2] = $1,100 at the end of the next year, estimate assets for quarters one through four of the second year $a[J = 2, j = 1], \ldots, a[J = 2, j = 4]$ to be $1,025, $1,050, $1,075, $1,100. |
| Interpolate_start | Given values of an Avar A[J] at the start of several larger time periods, estimate values a[j] at the start of smaller time periods by linear interpolation. Formula: $a[J, j] = (N - j) * A[J] + j * A[J + 1])/N$ where N = 4 quarters per year | Given assets of A[J = 1] = $1,000 at the start of the first year and A[J = 2] = $1,100 at the start of the next year, estimate assets for quarters one through four of the first year $a[J = 1, j = 1], \ldots, a[J = 1, j = 4]$ to be $1,000, $1,025, $1,050, $1,075. |
| Interpolate_flow | Given values of a flow Avar A[J] for several larger time periods, estimate values a[j] for smaller time periods by linear interpolation. Formula: $a[J, j] = (A[J] + (j/(N + 1) - \frac{1}{2}) * (A[J + 1] - A[J - 1])/N$ where N = 4 quarters per year | Given revenue of A[1] = $1,000 for the first year and A[2] = $1,100 for the next year, estimate revenues for quarters one through four of the second year $a[J = 2, j = 1], \ldots, a[J = 2, j = 4]$ to be $260, $270, $280 and $290. |
| Repeat | Given values for an Avar for a larger time period, estimate values for smaller time periods as equal to that value of for the larger time period. | Given gross margin percent (GM %) for a year, estimate GM % for each quarter in the year by repeating the value for annual GM %. This is an approximation. An exact Split can be obtained by the "Formula" method if quarterly gross margin and quarterly revenue are known. |
| Formula | Given values of an Avar for larger time periods, estimate values for smaller time periods using a formula based on other variables. | Given annual gross margin percent (GM %), quarterly gross margin and quarterly revenue, compute GM % for each quarter in the year using the formula GM % = gross margin/revenue. Annual GM % is not needed to compute quarterly GM %. |

TABLE 7

SDimension Split Operators

| Operator | Description | Example |
| --- | --- | --- |
| Proportion | Split data for larger segments to get totals for a smaller segments contained in the larger segments. | Allocate North American revenue of $1,000 to three countries by assigning $333.33 to each country. |
| Repeat | Given values for an Avar for a larger segment, estimate values for smaller segments. | Given global gross margin percent (GM %), estimate GM % for each country by repeating the value of global GM %. An exact Split can be obtained by the "Formula" method if country gross margin and country revenue are known. |
| Formula | Given values of an Avar for larger segments, compute reasonable estimates of values for smaller segments using a formula based on other variables. The "Formula" SDimension Split operator requires values of the variables appearing in the formula for the finer segments. | Given global gross margin percent (GM %), country gross margin and country revenue, compute GM % for each country using the formula GM % = gross margin/revenue. Global GM % is not needed to compute country GM %. |

Time Split operator "Interpolate" does not have an analogous SDimension Combine Operator because the items in an SDimension do not generally have a standard ordering.

3.8.5 Compatibility Between Combine and Split Operators

For each Analysis Variable, Combine and Split Operators can be chosen so that a Split operation (from finer grain A to coarser grain B) followed by the Combine Operation (from coarser grain to finer grain) yields the original data. That is, $CB(\text{Split}(\text{Avar}[\text{coarse grain}], \text{fine grain}), \text{coarse grain}) = \text{Avar}[\text{coarse grain}]$ This compatibility constraint applies to Time and SDimension Combine and Split operators. The following table indicates which Combine and Split operators are compatible.

TABLE 8

Compatibility of Combine and Split Operators

| | | Combine Operator | | | | |
| --- | --- | --- | --- | --- | --- | --- |
| | | Plus | Average | Last (Time only) | First (Time only) | Formula |
| Split Operator | Proportion | Yes | No | No | No | Yes* |
| | Repeat | No | Yes | Yes | Yes | Yes* |
| | Inerpolate_end (Time only) | No | No | Yes | No | Yes* |
| | Inerpolate_start (Time only) | No | No | No | Yes | Yes* |
| | Interpolate_flow (Time only) | Yes | No | No | No | Yes* |
| | Formula | Yes* | Yes* | Yes* | Yes* | Yes* |

*In order for the Formula method for Combine or Split to be compatible with a Split or Combine Operator, the formula must be appropriately chosen.

The reverse constraint—that Combine followed by Split yields the original data—is not relevant because some Split operators invent finer detail from the coarse data that will not match the original finer data before the Combine.

3.8.6 Combine and Split for Analysis Variables with Non-Numerical Values

In this exemplary implementation there are three non-numerical Element Types: Boolean, Date, and String. Also, Type Any refers to a general expression, such as an algebraic formula or a number or any of the other Element Types.

TABLE 9

Combine and Split Operators for Analysis Variables with Non-numerical Values

| Element Type | Combine Operator | Split Operator |
| --- | --- | --- |
| Any | formula | formula |
| | error | repeat |
| Boolean | or | repeat |
| Date | error | formula |
| | | repeat |
| String | Concat | repeat |

Note:
The Combine or Split operator listed below "Formula" is used when no formula is specified.

This compatibility constraint is satisfied for Analysis Variables of Element Types Boolean. It fails for Type String, because there are no obvious conforming choices of Combine and Split operators for Element Type String. So the model processing engine 12 uses operators that are often useful for Analysis Variables of Type String.

3.9 Formulas in Analysis Variables

Fundamental to the distinctions between different kinds of Formulas is the concept of a hierarchical tree structure, as defined for example in Wikipedia:

"A tree structure is a way of representing the hierarchical nature of a structure in a graphical form. It is named a "tree structure" because the graph looks a bit like a tree, even though the tree is generally shown upside down compared with a real tree; that is to say with the root at the top and the leaves at the bottom."

"In graph theory, a tree is a connected acyclic graph (or sometimes, a connected directed acyclic graph in which every vertex has indegree 0 or 1). An acyclic graph which is not necessarily connected is sometimes called a forest (because it consists of trees)." (URL: http://en.wikipedia.org/wiki/Tree_structure)

"In graph theory, the degree (or valency) of a vertex is the number of edges incident to the vertex." ... "In a directed graph, an edge has two distinct ends: a head (the end with an arrow) and a tail. Each end is counted separately. The sum of head endpoints count toward the indegree and the sum of tail endpoints count toward the outdegree." ... "If a vertex has a zero degree, it is called an isolated vertex." ... "If a vertex has a unity degree, it is called a leaf." (URL: http://en.wikipedia.org/wiki/Indegree)

The Formula Operational Type (labeled as "Formula") indicates to the processing engine 12 that the Operational Type of the arguments of a defining function of an Avar should be used. The processing engine 12 performs a Combine or Split operation on the arguments according to the Operational Type of the arguments, as described above in section 1. The Formula Operational Type can be set as the preferred Combine or Split method for an Analysis Variable if a defining function exists, and if a defining function is not provided, a backup Operational Type can provide backup Combine and Split operators to be used. An Avar having a Formula Operational Type is said to be Combined or Split "by formula" or "by the formula method."

These operators combine or split the components of the Analysis Variable to be combined or split using one of several standard methods. The Combine and Split operators denoted by "Formula" employ a user-specified formula to define the components of the Analysis Variable in terms of other Analysis Variables (or other components of the Analysis Variable being acted on), and then combine or split the Analysis Variables that appear in this formula. In the specification of an Analysis Variable, the dimensional operations distinguish between formulas associated with leaf nodes at the bottom of a hierarchy of segments, and formulas that define how to combine finer segments into higher (coarser) segments. The specification has two kinds of Formulas, called "C-Formulas" (a short term for "Combine Formulas") and "D-Formulas" (a short term for "Data Formulas"). Both types of formulas can be associated with any leaf or non-leaf nodes. The difference between C-Formulas and D-Formulas is at which nodes the formulas can be evaluated to assign a value to the Analysis Variable that contains them.

D-Formulas are used by the model processing engine 12 to fill in element values (e.g., numerical values) at leaf nodes of Avars of all types.

C-Formulas are used by the model processing engine 12 to roll up values of Avars of Type Ratio. C-Formulas usually tell the model processing engine 12 how to evaluate a rollup value of an Avar in terms of other Avars evaluated at the same node level in the dimension hierarchy, not in terms of values of the Avar at subordinate nodes. For example, a reasonable C-Formula for Avar "Gross_Margin$_{pct}$" would be Gross_Margin/Revenue, which defines gross margin percent in terms of other Avars at the same node level in the SDimension hierarchy. C-Formulas are used to generate data at leaf nodes of Avars of Type Ratio if a D-Formula is unavailable.

The concept of C-Formulas, the practice of distinguishing C-Formulas from D-Formulas, and the policy of when to employ C-Formulas and when to employ D-Formulas, are aspects of using Combine and Split operators for Avars of Formula Operational Type.

FIGS. 5-14 show examples of Combining and Splitting according to Operational Types. A first example illustrates use of Operational Types by Combining or Splitting Gross Margin Percent over a segmentation Dimension (Products in this example).

We start by reviewing computation of Gross Margin for comparison with computation of Gross Margin Percent.

If the model specification data 14 has values for Cost of Goods and Revenue for each of two products called A and B, then the model processing engine 12 can compute the Gross Margin for each product.

$$\text{Gross\_Margin}[Products.A] = \text{Revenue}[Products.A] - \text{Cost\_of\_Goods}[Products.A] \quad (1)$$

$$\text{Gross\_Margin}[Products.B] = \text{Revenue}[Products.B] - \text{Cost\_of\_Goods}[Products.B] \quad (2)$$

In this example, the Analysis Variable Gross_Margin has the Accounting Type "Margin" which implies the Operational Type "stock, count." More generally, Analysis Variables that count either currency or physical units have SDimension Operational Type Count.

All three Analysis Variables in this example (Revenue, Cost of Goods, and Gross Margin) have Operational Type "stock, count". This Operational Type causes Analysis Variables to be Combined over segmentation Dimensions by the "Sum Method" (summing values for the items in the SDimension) and Split over segmentation Dimensions by the "Proportion Method" (allocate the total of the Avar equally across the items in the SDimension).

For the Combine operation (finding Gross Margin for all Products based on Gross Margin for Products A and B), the model processing engine 12 uses the Sum Method to Combine Gross Margin over products by addition.

$$\text{Gross\_Margin}[Products] = \text{sum}(\text{Revenue}[Products] - \text{Cost\_of\_Goods}[Products], Products) = \text{sum}(\text{Gross\_Margin}[Products], Products) = \text{Gross\_Margin}[Products.A] + \text{Gross\_Margin}[Products.B] \quad (3)$$

For the Split operation (finding Gross Margin for Product A and B based on Gross Margin for all Products), in the absence of the Revenue and Cost of Goods values needed to compute Gross Margin for each product, the model processing engine 12 estimates Gross Margin over products by Splitting Gross Margin by proportion.

$$\text{Gross\_Margin}[Products.A] = \text{Gross\_Margin}[Products]/2 \quad (4)$$

$$\text{Gross\_Margin}[Products.B] = \text{Gross\_Margin}[Products]/2 \quad (5)$$

We now review computation of Gross Margin Percent. If the model specification data 14 has values for Gross Margin and Sales Revenue for each of two products called A and B, then the model processing engine 12 can compute the Gross Margin Percent for each product separately.

$$\text{Gross\_Margin\_pct}[Products.A] = \text{Gross\_Margin}[Products.A]/\text{Revenue}[Products.A] \quad (6)$$

$$\text{Gross\_Margin\_pct}[Products.B] = \text{Gross\_Margin}[Products.B]/\text{Revenue}[Products.B] \quad (7)$$

In this example, the Analysis Variable Gross Margin Percent has the Accounting Type "Margin %" which implies the Operational Type "stock, ratio." This Operational Type causes the model processing engine 12 to use "Combine by Formula" and "Split by Formula" on the Analysis Variable Gross Margin Percent.

Analysis Variables that are not Count variables (e.g., they do not count currency or physical units) have SDimension Operational Type "Ratio." The principles of this example apply to Avars with this Operational Type.

To Combine Gross Margin Percent over the two products, any of the following three methods can be selected based on a corresponding Operational Type, with different levels of accuracy.

"Combine by Sum"

$$\text{Gross\_Margin\_pct[Products]} = \text{sum}(\text{Gross\_Margin} \\ \text{[Products]/Revenue[Products], Products)} = \text{sum} \\ (\text{Gross\_Margin\_pct[Products], Products}) \quad (8)$$

This method yields the wrong result. For example, if each product has a Gross Margin Percent of 60%, then this method returns a Gross Margin Percent of 120% for the whole product line. The correct value is 60%.

"Combine by Average"

$$\text{Gross\_Margin\_pct[Products]} = \text{average}(\text{Gross\_Margin} \\ \text{[Products]/Revenue[Products], Products)} = \text{average}(\text{Gross\_Margin}_{pct}\text{[Products], Products}) \quad (9)$$

This method is an approximation and works well (exactly) if the values of Revenue for the two products are roughly (exactly) equal.

"Combine by Formula"

$$\text{Gross\_Margin}_{pct}\text{[Products]} = \text{sum}(\text{Gross\_Margin[Products], Products)/sum(Revenue[Products], Products}) \quad (10)$$

This method yields the exact Gross Margin Percent of the entire product line in all cases.

Each of these three Combining methods is illustrated in FIG. 5 with a numerical example, in FIG. 6 with corresponding output spreadsheet formulas generated by the model processing engine 12. FIG. 7 shows the formulas used for the Combine by Formula method according to a Formula Operational Type. The cells that contain Combined values or formulas are outlined by heavy blue lines. Cells that are shaded pink contain values or formulas that are independent inputs (e.g., provided by a user).

In an example of Splitting Gross Margin Percent, given Gross Margin Percent for an entire product line, automatic Split operations estimate the Gross Margin Percent for each product.

To Split Gross Margin Percent over the two products, any of the three methods Split by Proportion, Split by Replication, or Split by Formula can be selected based on a corresponding Operational Type, with different levels of accuracy. FIG. 8 shows a numerical example of the results of Splitting using these three methods. FIG. 9 shows the corresponding spreadsheet formulas output for each of these three methods. FIG. 10 shows the corresponding Avar formulas used for the Split by Formula method according to a Formula Operational Type.

FIG. 11 shows a numerical example and corresponding formula for Combining over a time dimension of an Analysis Variable of Time Operational Type "Flow." The corresponding Combine operator is "combine by plus."

FIG. 12 shows a numerical example and corresponding formula for Combining over a time dimension of an Analysis Variable of Time Operational Type "Stock." The corresponding Combine operator is "combine by last."

FIG. 13 shows three numerical examples and corresponding formulas for Splitting over a time dimension of an Analysis Variable of Time Operational Type "Flow." The Splitting operation depends on assumptions about the previous Time period. There are three cases that correspond to three different Split operations.

In the first case, "split by proportion" is used, which corresponds to an assumption that any trend in the variable values across time periods should be ignored.

In the second case, "split by interpolate-0" is used, which corresponds to an assumption that the variable value for the previous time period is zero. This may be appropriate at the start time of a model.

In the third case, "split by interpolate" is used, which corresponds to an assumption that the value for the variable in the previous time period (Quarter 1 in this example) is known.

FIG. 14 shows three numerical examples and corresponding formulas for Splitting over a time dimension of an Analysis Variable of Time Operational Type "Stock."

The Splitting operation depends on assumptions about the previous Time period. This example shows appropriate formulas for a "Stock" Time Operational Type in the same three cases described above with reference to FIG. 13.

3.10 Use of Operational Types to Determine Combine and Split Operators

The Time Operational Types and SDimension Operational Types determine which Combine and Split operators to use in specific situations. A representative situation is an assignment statement of the form A=f(B, C), where A, B and C are Avars, 'j' is a free dimension of one or more of A, B and C, and f is a function of B and C representing a formula for a node of the Avar A that includes the Avars B and C.

Operational Types can be used in combination with various rules for determining Combine and Split operators in a given situation. Some exemplary rules for determining the Combine and Split operators are listed below.

If only one Avar is being Combined or Split, then the Operational Type of that Avar determines the operator.

If the Combine or Split operation occurs over a function on the right hand side of the assignment statement (e.g., f), then the Type of A determines the operator.

If the right hand side is a product (such as B*C), then the entire product is considered to have an index 'j' if any of the factor Avars do, and the entire product is Combined or Split together (not the separate factors).

For general functions (such as exponentiation and logarithms, but not plus, times), If all arguments have/lack the same dimensional index, perform any adjustments on that index outside the function.

If some arguments have and some do not have a dimensional index, then adjust the arguments to agree with the left side of the assignment statement.

Table 11 contains examples of how Operational Types determine Combine or Split Operators. The "problem specification" shows the assignment statement for the Avar A, the Operational Type(s) of the Avar A, and the Operational Type(s) of the Avars B and C. The "problem solution" shows the formula used by the model processing engine 12 to perform the Combine (CB) or Split (SP), and the Combine or Split Operator used in the formula.

TABLE 11

| Problem Specification | | | Problem Solution | |
|---|---|---|---|---|
| Assignment | Type of A | Types of B, C | Formula | Operator |
| A = Constant * B[j] | Count or Ratio | Count | A = Constant * CB(B[j], j) | CB by plus |
| | | Ratio | | CB by average |
| A[j] = Constant * B | | Count | A[j] = Constant * SP(B, j) | SP by proportion |
| | | Ratio | | SP by repeat |
| A = B[j] * C | Count | Count or Ratio | A = CB(B[j] * C, j) | CB by plus |
| | Ratio | | | CB by average |
| A = B[j] * C[j] | Count | | A = CB(B[j] * C[j], j) | CB by plus |
| | Ratio | | | CB by average |
| A[j] = B * C | Count | | A[j] = SP(B * C, j) | SP by proportion |
| | Ratio | | | SP by repeat |
| A = B[j] ^ C | Count or Ratio | B Count, C either | A = CB(B[j], j) ^ C | CB by plus |
| | | B Ratio, C either | | CB by average |
| A = B[j] ^ C[j]) | Count | Count or Ratio | A = CB(B[j] ^ C[j], j) | CB by plus |
| | Ratio | | | CB by average |
| A[j] = B ^ C | Count | Count or Ratio | A[j] = SP(B ^ C, j) | SP by proportion |
| | Ratio | | | SP by repeat |
| A[j] = B[j] ^ C | Count or Ratio | Count | A[j] = B[j] ^ SP(C, j) | SP by proportion |
| | | Ratio | | SP by repeat |

4 Shadow Analysis Variables

The systems of Combine and Split Operators, Operational Types, C-Formulas and D-Formulas enables the model processing engine 12 to automatically identify, compute and store intermediate results that simplify more complex computations. These intermediate results are called "Shadow Avars." One use of Shadow Avars is to compute a sub-formula that must be Combined in order to eliminate one or more extra SDimensions. In this case, each Shadow Avar implements one formula for the entire Avar, for example Combine(f(A), Dim), where A is an Avar and Dim is an SDimension. Attempting in spreadsheets a computation that uses shadow Avars in the modeling system 10 would be done by manually identifying and computing the intermediate results, or else dealing with the full complexity of the computation without intermediate results.

4.1 Example that Uses Combine Operators, C-Formulas and D-Formulas

Consider a revenue model of a product line specified as follows. The product line has two products called A and B, and B has two variant products called B1 and B2. Input data are Sales_Units and Price for products A, B1 and B2.

Compute:
revenue for products A, B1 and B2 as Revenue=Price× Sales_Units
revenue for product B by adding revenue for B1 and B2; revenue for the product line by adding revenue for A and B.
sales units for product B by adding sales units for B1 and B2; sales units for the product line by adding sale units for A and B.
average prices for product B and the total product line as Price=Revenue/Sales_Units.

Using some numerical values, the results of this revenue model are shown in FIG. 15, where shaded cells contain input data.

Spreadsheet formulas generated by the model processing engine 12 to implement this revenue model are shown in FIG. 16.

The model processing engine 12 automates the thought processes and the manual tasks that would otherwise be used to compute and lay out this revenue model. In order to accomplish this with a minimum of conceptual complexity, the model processing engine 12 uses C-Formulas, D-Formulas and Combine Operators and input from a user as shown in FIG. 17 and as described below.

The (human) user enters the following information.
Enter data type for Sales Units, Price and Revenue that determine Combine and Split operators, including whether the formula method for Combine and Split takes precedence over the default operators.
Enter D-Formula and C-Formula for Analysis Variable Price.
Enter sales units for products A, B1, B2 in both time periods, and prices for these products in the first time period.

The model processing engine 12 uses C-Formulas, D-Formulas and Combine Operators to compute the model as follows.
Compute prices at leaf nodes (i.e. for products A, B1, B2) in all subsequent time periods using D-Formula Prev( ).
Compute revenue for products A, B1 and B2 using the D-Formula Revenue=Price×Sales_Units
Compute revenue for product B and the total product line using the Combine Operator 'plus'.
Compute sales units for product B and the total product line using the Combine Operator 'plus'.
Compute average prices for product B and the total product line using the D-Formula Price=Revenue/Sales_Units.

The computation of Sales Units and Revenues is quite simple. Getting the right result for average prices for the non-leaf nodes B and 'total product line' drives the complexity of the model.

5 Warn-and-Choose System

Some formulas have more than one legitimate and useful interpretation in terms of automatic processes. In such cases, the model processing engine 12 warns the user about the ambiguity and asks the user to resolve it. In many cases, the model processing engine 12 will present the user with the most common alternatives, which can be selected without retyping the affected formula.

In a conventional spreadsheet, the user must specify the formulas manually, which takes time, but it forces the user to make explicit choices. The model processing engine 12 ensures that it does not introduce meanings that the user did not intend and the user may not notice because of the automation. The Warn and Choose system facilitates building a reliable system that enables reliable automation of computational processes in situations where it cannot automatically eliminate ambiguity.

The remainder of this section discusses simple examples of formulas that have more than one legitimate and useful interpretation in terms of automatic Combine and Split Operators.

5.1 Example: Interaction of Combine and Round Functions

Given Analysis Variable X with one dimension Dim1 (e.g., a Time Series or SDimension) and Analysis Variable Y with no dimensions, make the following assignment.

$$Y[\ ]=Round(X[Dim1])$$

The dimension Dim1 is Combined in order to fit the result into Y[ ]. The model processing engine 12 can interpret this in either of two ways, depending on the ordering of CB and Round.

$$Y[\ ]=CB(Round(X[Dim1]), Dim1)$$

$$Y[\ ]=Round(CB(X[Dim1], Dim1))$$

These two interpretations are not equivalent. For example, if Dim1 that has two items and the value of X is 0.3 for each item, then the first interpretation yields Y=round(0.3)+round(0.3)=0, and the second yields Y=round(0.3+0.3)=1.

For low safety settings, the model processing engine 12 might choose either interpretation. For high safety settings, the model processing engine 12 should warn the user of the existence of an ambiguous situation and ask the user to choose one interpretation.

More generally, Combine and Split Operations generally do not commute with nonlinear functions F.

$$CB(F(X[Dim1], Dim1) \neq F(CB(X[Dim1], Dim1))$$

$$SP(F(X[\ ], Dim1) \neq F(SP(X[\ ], Dim1))$$

5.2 Example: Multiplication of Two Analysis Variables

Suppose we have three Analysis Variables A, B, and C, with dimension Dim1, and the relationship $$A[Dim1]=B[Dim1]*C[Dim1]$$

This situation is not ambiguous: for each item in Dim1, multiply B*C and store the result in the corresponding cell of A.

5.3 Example: Multiplication and Split Operations

The following variant situation is ambiguous.

$$A[Dim1]=B[\ ]*C[\ ]$$

It can be interpreted in two ways, depending on the order of Splitting and multiplication.

$$A[Dim1]=SP(B[\ ]*C[\ ], Dim1)$$

$$A[Dim1]=SP(B[\ ], Dim1)*SP(C[\ ], Dim1)$$

If A, B and C have Operational Type "Count" (the most common case), Split means to divide the total proportionally among the Items of the dimension. If dimension Dim1 has two items and B[ ]=3 and C[ ]=5, then the first interpretation yields A[Dim1.1]=A[Dim1.2]=(3*5)/2=7.5, and the second interpretation yields A[Dim1.1]=A[Dim1.2]=(3/2)*(5/2)=3.75.

In high safety mode, the model processing engine 12 should warn the user about such ambiguous situations and ask him to specify which interpretation to employ.

5.4 Example: Multiplication and Combine Operations

A similar ambiguity arises in interpreting the formula below.

$$A[\ ]=B[Dim1]*C[Dim1]$$

It can be interpreted in two ways, depending on the order of applying CB and multiplication.

$$A[\ ]=CB(B[Dim1]*C[Dim1], Dim1)$$

$$A[\ ]=CB(B[Dim1], Dim1)*CB(C[Dim1], Dim1)$$

If A, B and C have Operational Type "count" (the most common case), Combine means to add the values of items of the dimension. If dimension Dim1 has two items and B[Dim1.1]=B[Dim1.2]=3 and C[Dim1.1]=C[Dim1.2]=5, then the first interpretation yields A[ ]=(3*5)+(3*5)=30, and the second interpretation yields A[ ]=(3+3)*(5+5)=60.

In high safety mode, the model processing engine 12 should warn the user about such ambiguous situations and ask him to specify which interpretation to employ.

5.5 Example: Treatment of Fixed and Variable Costs

Consider the following Analysis Variable that includes operating expenses for Marketing and Sales departments. FIG. 18 shows a numerical example, a spreadsheet formula, and an Avar formula for a total of operating expenses. The Avar formula corresponds to a Combine operation (by sum) over Marketing and Sales departments, and the spreadsheet formula is automatically generated to refer to the appropriate cell addresses.

Let's break the Sales department into two regional sections, named North America and International. If the user introduces the two sales offices into the model, then the model processing engine 12 automatically Splits the Sales department expenses over the two offices. However, there are two reasonable and practical interpretations of how the expenses should be Split.

The $100 expense for the sales department is a fixed cost that does not change when new sales offices are added.

The $100 expense for the sales department is a variable cost that is incurred by each sales office.

The two ways of Splitting the Sales expense are shown in FIGS. 19 and 20 in numerical form, in spreadsheet formulas, and in Avar formulas. FIG. 19 shows the results assuming a fixed total expense ($100) split evenly over the two offices. FIG. 20 shows the results assuming a variable total expense that depends on the number of offices.

In this example, The Analysis Variable Operating Expense has Accounting Type "Expense," which implies Operational Type "Count." If the user does not specify whether the expense is fixed or variable, the model processing engine 12 behaves as follows in some implementations.

At low safety settings, the model processing engine 12 uses the Operational Type to Split the Sales Department expense by proportion, assigning each office $50.

At high safety settings, model processing engine 12 warns the user that two legitimate and practical interpretations exist for the Split operation, and asks the user to specify which one is correct.

In general, automatic Split operations for Analysis Variables of Operational Type "Count" have this ambiguity. Therefore, with high safety settings, the model processing engine 12 should warn the user about each automatic Split operation and ask for a clarification.

6 Implementations

The mathematical modeling approaches described above can be implemented using software for execution on a computer. For instance, the software defines procedures in one or more computer programs that execute on one or more programmed or programmable computer systems (e.g., desktop, distributed, client/server computer systems) each including at least one processor, at least one data storage system (e.g., including volatile and non-volatile memory and/or storage elements), at least one input device (e.g., keyboard and mouse) or port, and at least one output device (e.g., monitor) or port. The software may form one or more modules of a larger program.

The software may be provided on a computer-readable storage medium, such as a CD-ROM, readable by a general or special purpose programmable computer or delivered over a medium (e.g., encoded in a propagated signal) such as network to a computer where it is executed. Each such computer program is preferably stored on or downloaded to a storage media or device (e.g., solid state memory or media, or magnetic or optical media) readable by a general or special purpose programmable computer, for configuring and operating the computer when the storage media or device is read by the computer system to perform the procedures of the software.

Other embodiments are within the scope of the following claims.

What is claimed is:

1. A computer-based method, comprising:
receiving, by a computer, model specification data specifying:
 a dimensional operation associated with a plurality of generation methods;
 a dimension that corresponds to a quantity over which interval arithmetic is defined, the dimension including at least one segment;
 an analysis variable having an input formula for determining values of the analysis variable along the dimension; and
 an operational type associated with the analysis variable and the dimensional operation, the operational type specifying a generation method from the plurality of generation methods;
identifying, by the computer, the generation method based on the analysis variable, the dimensional operation and the operational type;
generating a first set of arguments for the input formula for a first set of one or more segments of the dimension, wherein generating the first set of arguments for the input formula for the first set of one or more segments includes generating the first set of arguments for the input formula for multiple non-overlapping ranges of the quantity;
automatically generating, by the computer, an output formula from the input formula using the generation method, wherein automatically generating the output formula comprises processing the first set of arguments according to the generation method to generate a second set of arguments for the input formula for a second set of one or more segments of the dimension different from the first set of one or more segments of the dimension; and
storing, by the computer, the automatically generated output formula or presenting, by the computer, a representation based on the automatically generated output formula using a user interface, wherein receiving the model specification data includes receiving model specification data specifying that the dimension be associated with a dimensional operation that combines one or more of the ranges into at least one combined range of the quantity in second set of one or more segments.

2. The method of claim 1, further comprising generating multiple output formulas from the input formula, each output formula corresponding to a different segment of the dimension.

3. The method of claim 2, wherein automatically generating the output formula comprises generating the output formula from the input formula for a combination of multiple segments of the dimension.

4. The method of claim 1, further comprising generating a segment output formula from the input formula for a segment of the dimension.

5. The method of claim 4, wherein automatically generating the segment output formula comprises generating multiple output formulas from the input formula for different subsegments of the segment of the dimension.

6. The method of claim 1, wherein the automatically generated output formula comprises a formula in a cell of a spreadsheet generated based on the second set of arguments for the second set of one or more segments of the dimension.

7. The method of claim 1, wherein receiving the model specification data includes receiving model specification data specifying that the dimension corresponds to time.

8. The method of claim 1, wherein generating the first set of arguments for the input formula for the first set of one or more segments includes generating the first set of arguments for the input formula for at least one range of the quantity and wherein receiving the model specification data includes receiving model specification data specifying that the dimension be associated with a dimensional operation that splits at least one range into multiple non-overlapping ranges of the quantity in the second set of one or more segments.

9. The method of claim 1, wherein automatically generating the output formula comprises determining one of multiple valid ways to apply the generation method to generate the second set of arguments based at least in part on feedback from a user.

10. The method of claim 1, wherein receiving the model specification data includes receiving model specification data specifying that the at least one segment include a plurality of segments capable of being interrelated in a hierarchy wherein each parent in the hierarchy corresponds to a segment that is a combination of segments corresponding to children of the parent.

11. The method of claim 10, wherein receiving the model specification data includes receiving model specification data specifying that the dimension be associated with a dimensional operation that specifies generation of arguments for segments corresponding to a first level in the hierarchy based on one or more input formulas for segments corresponding to a second level in the hierarchy different from the first level.

12. The method of claim 1, wherein receiving the model specification data includes receiving model specification data specifying that the input formula of the analysis variable includes a first set of one or more analysis variables that each depend on the dimension.

13. The method of claim 12, wherein receiving the model specification data includes receiving model specification data specifying that the dimensional operation associated with the dimension specifies generation of a second set of one or more analysis variables based on the first set of one or more analysis variables.

14. The method of claim 13, wherein automatically generating the output formula comprises applying the input formula to the second set of one or more analysis variables.

15. A non-transitory computer-readable medium having stored therein instructions for causing a computer to:
receive model specification data specifying:
 a dimensional operation associated with a plurality of generation methods;

a dimension that corresponds to a quantity over which interval arithmetic is defined, the dimension including at least one segment;

an analysis variable having an input formula for determining values of the analysis variable along the dimension; and an operational type associated with the analysis variable and the dimensional operation, the operational type specifying a generation method from the plurality of generation methods;

identify, the generation method based on the analysis variable, the dimensional operation and the operational type;

generate a first set of arguments for the input formula for a first set of one or more segments of the dimension, the first set of one or more segments including multiple non-overlapping ranges of the quantity;

automatically generate an output formula from the input formula using the generation method by processing the first set of arguments according to the generation method to generate a second set of arguments for the input formula for a second set of one or more segments of the dimension different from the first set of one or more segments of the dimension; and store the automatically generated output formula or present a representation based on the automatically generated output formula using a user interface, wherein the instructions for causing the computer to receive the model specification data include instructions to receive model specification data specifying that the dimension be associated with a dimensional operation that combines one or more of the ranges into at least one combined range of the quantity in the second set of one or more segments.

16. A computer-based method, comprising:

receiving, by a computer, model specification data specifying:

at least one dimension that corresponds to a quantity over which interval arithmetic is defined, the at least one dimension being associated with a hierarchy;

an analysis variable that has an operational type and that depends on the at least one dimension; and a dimensional operation that in combination with the analysis variable and the operational type specifies a first input formula that determines values for the analysis variable where the analysis variable is associated with one or more levels of the hierarchy and a second input formula different from the first input formula that determines a combination of multiple values from a given level of the hierarchy for the analysis variable where the analysis variable is associated with a different level of the hierarchy;

generating a first set of arguments for the first input formula for a first set of one or more segments of the at least one dimension, wherein generating the first set of arguments for the first input formula for the first set of one or more segments includes generating the first set of arguments for the first input formula for multiple non-overlapping ranges of the quantity;

automatically generating, by the computer, an output formula from the analysis variable, wherein automatically generating the output formula comprises processing the first set of arguments according to a generation method to generate a second set of arguments for the first input formula for a second set of one or more segments of the at least one dimension different from the first set of one or more segments of the at least one dimension; and storing, by the computer, the automatically generated output formula or presenting, by the computer, a representation based on the automatically generated output formula using a user interface, wherein receiving the model specification data includes receiving model specification data specifying that the at least one dimension be associated with a dimensional operation that combines one or more of the ranges into at least one combined range of the quantity in the second set of one or more segments.

17. The method of claim 16, wherein receiving the model specification data includes receiving model specification data specifying that the hierarchy associated with the at least one dimension corresponds to a graph of nodes having a tree structure where each node represents a segment of the dimension, and the segment represented by a given parent node is based on a combination of segments represented by child nodes of the given parent node.

18. The method of claim 17, wherein receiving the model specification data includes receiving model specification data specifying that the first input formula is associated with a corresponding node.

19. The method of claim 18, wherein receiving the model specification data includes receiving model specification data specifying that the first input formula determines a value of the corresponding node if the corresponding node is a leaf node or of a subordinate node if the corresponding node is not a leaf node.

20. The method of claim 17, wherein receiving the model specification data includes receiving model specification data specifying that the second input formula is associated with a corresponding node.

21. The method of claim 20, wherein receiving the model specification data includes receiving model specification data specifying that the analysis variable specifies one of multiple default operators for performing a dimensional operation that includes combining segments represented by child nodes of a parent node.

22. The method of claim 21, wherein receiving the model specification data includes receiving model specification data specifying that the second input formula determines a combination of values of child nodes of the corresponding node in place of the specified default operator.

23. The method of claim 20, wherein receiving the model specification data includes receiving model specification data specifying that the second input formula determines a value for the corresponding node if the corresponding node is a leaf node and no other formula determines a value for the corresponding node.

24. The method of claim 20, wherein receiving the model specification data includes receiving model specification data specifying that the second input formula determines a value for the corresponding node based on a combination of values of child nodes of the corresponding node that are added in a dimensional operation that includes splitting the segment represented by the corresponding node into multiple segments.

25. The method of claim 17, wherein receiving the model specification data includes receiving model specification data specifying that segments have a predetermined ordering.

26. The method of claim 17, wherein receiving the model specification data includes receiving model specification data specifying that the first input formula is associated with a first level of the hierarchy and the second input formula is associated with a second level of the hierarchy different from the first level.

27. The method of claim 26, wherein receiving the model specification data includes receiving model specification data specifying that the first input formula determines a value for at least one leaf node.

28. The method of claim 27, wherein receiving the model specification data includes receiving model specification data specifying that the second input formula determines a combination of values of child nodes of a parent node at the second level.

29. The method of claim 17, wherein receiving the model specification data includes receiving model specification data specifying that the first input formula and second input formula are associated with the same non-leaf node.

30. The method of claim 29, further comprising determining values for child nodes of the non-leaf node so that the combination determined by the second input formula is consistent with a value determined by the first input formula.

31. The method of claim 29, further comprising determining a value for the non-leaf node based on the combination determined by the second input formula even if a value determined by the first input formula is different from the combination determined by the second input formula.

32. A non-transitory computer-readable medium having stored therein instructions for causing a computer to:
receive model specification data specifying:
at least one dimension that corresponds to a quantity over which interval arithmetic is defined, the at least one dimension being associated with a hierarchy;
an analysis variable that has an operational type that depends on the at least one dimension; and
a dimensional operation that in combination with the analysis variable and the operational type specifies a first input formula that determines values for one or more levels of the hierarchy and a second input formula different from the first input formula that determines a combination of multiple values from a given level of the hierarchy for a different level of the hierarchy;
generate a first set of arguments for the first input formula for a first set of one or more segments of the at least one dimension, the first set of one or more segments including multiple non-overlapping ranges of the quantity;
automatically generate an output formula from the analysis variable by processing the first set of arguments according to a generation method to generate a second set of arguments for the first input formula for a second set of one or more segments of the at least one dimension different from the first set of one or more segments of the at least one dimension; and
store the automatically generated output formula or present a representation based on the automatically generated output formula using a user interface, wherein the instructions for causing the computer to receive the model specification data include instructions to receive model specification data specifying that the at least one dimension be associated with a dimensional operation that combines one or more of the ranges into at least one combined range of the quantity in the second set of one or more segments.

33. The method of claim 1, wherein receiving the model specification data includes receiving model specification data specifying that the analysis variable has an input formula written in terms of analysis variables and generating the output formula includes generating an output formula written in terms of a table of cells.

34. A computer system comprising:
a memory; and
at least one processor coupled to the memory and configured to:
receive model specification data specifying:
a dimensional operation associated with a plurality of generation methods;
a dimension that corresponds to a quantity over which interval arithmetic is defined, the dimension including at least one segment;
an analysis variable having an input formula for determining values of the analysis variable along the dimension; and
an operational type associated with the analysis variable and the dimensional operation, the operational type specifying a generation method of the plurality of generation methods;
identify the generation method based on the analysis variable, the dimensional operation, and the operational type;
generate a first set of arguments for the input formula for a first set of one or more segments of the dimension, the first set of one or more segments including multiple non-overlapping ranges of the quantity;
automatically generate an output formula from the input formula using the generation method by processing the first set of arguments according to the generation method to generate a second set of arguments for the input formula for a second set of one or more segments of the dimension different from the first set of one or more segments of the dimension; and
store the automatically generated output formula or present a representation based on the automatically generated output formula using a user interface, wherein the at least one processor is configured to receive the model specification data by receiving model specification data specifying that the dimension be associated with a dimensional operation that combines one or more of the ranges into at least one combined range of the quantity in the second set of one or more segments.

35. A computer system comprising:
a memory; and
at least one processor coupled to the memory and configured to:
receive model specification data specifying:
at least one dimension that corresponds to a quantity over which interval arithmetic is defined, the at least one dimension associated with a hierarchy;
an analysis variable that has an operational type and that depends on the at least one dimension; and
a dimensional operation that in combination with the analysis variable and the operational type specifies a first input formula that determines values for the analysis variable where the analysis variable is associated with one or more levels of the hierarchy and a second input formula different from the first input formula that determines a combination of multiple values from a given level of the hierarchy for the analysis variable where the analysis variable is associated with a different level of the hierarchy;
generate a first set of arguments for the first input formula for a first set of one or more segments of the at least one dimension, the first set of one or more segments including multiple non-overlapping ranges of the quantity;
automatically generate an output formula from the analysis variable by processing the first set of arguments according to a generation method to generate a second set of arguments for the first input formula for a second set of one or more segments of the at least one dimension different from the first set of one or more segments of the at least one dimension; and store the automatically generated output formula or present a representation based on the automatically generated output formula using a user interface, wherein the at least one processor is configured to receive the model specification data by receiving model specification data specifying that the at least one dimension be associated with a dimensional operation that combines one or more of the ranges into at least one combined range of the quantity in the second set of one or more segments.

36. The method of claim 1, wherein generating the output formula written in terms of a table of cells includes generating an output formula written in terms of cells a spreadsheet.

* * * * *

UNITED STATES PATENT AND TRADEMARK OFFICE
CERTIFICATE OF CORRECTION

PATENT NO.       : 8,577,704 B2                                     Page 1 of 1
APPLICATION NO.  : 11/953627
DATED            : November 5, 2013
INVENTOR(S)      : Howard I. Cannon et al.

It is certified that error appears in the above-identified patent and that said Letters Patent is hereby corrected as shown below:

In the Specification:

Column 5, line 49, delete "screem o;;istrations" and insert --screen illustrations--.

Column 6, line 4, delete "cell" and insert --cells--.

Column 6, line 4, delete "dataq" and insert --data--.

In the Claims:

Claim 1, column 37, line 63, before the word "second", insert --the--.

Signed and Sealed this
Eleventh Day of March, 2014

Michelle K. Lee
*Deputy Director of the United States Patent and Trademark Office*